(12) United States Patent
Gritter et al.

(10) Patent No.: US 10,956,196 B1
(45) Date of Patent: Mar. 23, 2021

(54) LOAD BALANCING VM SELECTION AND MOVEMENT

(71) Applicant: Tintri by DDN, Inc., Santa Clara, CA (US)

(72) Inventors: Mark G. Gritter, Eagan, MN (US); Satya Vempati, Cupertino, CA (US); Siva Popuri, Mountain View, CA (US)

(73) Assignee: Tintri by DDN, Inc., Santa Clara, CA (US)

( * ) Notice: Subject to any disclaimer, the term of this patent is extended or adjusted under 35 U.S.C. 154(b) by 229 days.

(21) Appl. No.: 15/693,251

(22) Filed: Aug. 31, 2017

Related U.S. Application Data

(60) Provisional application No. 62/448,257, filed on Jan. 19, 2017.

(51) Int. Cl.
*G06F 9/455* (2018.01)

(52) U.S. Cl.
CPC .. *G06F 9/45558* (2013.01); *G06F 2009/4557* (2013.01); *G06F 2009/45562* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 6,314,465 B1 | 11/2001 | Paul | |
| 9,135,033 B1 * | 9/2015 | Lee | G06F 9/455 |
| 2009/0307597 A1 | 12/2009 | Bakman | |
| 2011/0010514 A1 | 1/2011 | Benhase | |
| 2012/0036327 A1 | 2/2012 | Jennas, II | |
| 2012/0185851 A1 | 7/2012 | Zhang | |
| 2012/0272237 A1 | 10/2012 | Baron | |
| 2013/0097601 A1 | 4/2013 | Podvratnik | |
| 2013/0238780 A1 | 9/2013 | Devarakonda | |
| 2014/0250439 A1 | 9/2014 | Parashar | |
| 2016/0070601 A1 | 3/2016 | Yamamoto | |
| 2016/0070602 A1 | 3/2016 | Shimogawa | |
| 2016/0378563 A1 | 12/2016 | Gaurav | |
| 2017/0060611 A1 * | 3/2017 | Birkestrand | G06F 9/4856 |
| 2018/0139100 A1 | 5/2018 | Nagpal | |

OTHER PUBLICATIONS

Jianhai et al., Affinity-Aware Grouping for Allocation of Virtual Machines, 2013, 2013 IEEE 27th International Conference on Advanced Information Networking and Applications, pp. 235-242 (Year: 2013).*

* cited by examiner

*Primary Examiner* — Lewis A Bullock, Jr.
*Assistant Examiner* — Melissa A Headly
(74) *Attorney, Agent, or Firm* — Van Pelt, Yi & James LLP

(57) ABSTRACT

Load balancing VM selection and movement is disclosed, including: selecting a combined predicted metric to be improved with respect to a plurality of storage devices; and determining a set of VMs to be moved from a first storage device included in the plurality of storage devices to a second storage device included in the plurality of storage devices such that the selected combined metric to improve is predicted to improve.

22 Claims, 17 Drawing Sheets

US 10,956,196 B1

LOAD BALANCING VM SELECTION AND MOVEMENT

CROSS REFERENCE TO OTHER APPLICATIONS

This application claims priority to U.S. Provisional Patent Application No. 62/448,257 entitled LOAD BALANCING VM SELECTION AND MOVEMENT filed Jan. 19, 2017 which is incorporated herein by reference for all purposes.

BACKGROUND OF THE INVENTION

Storage devices that store data typically react to mitigate the effects of undesirable events after detecting the occurrence of such undesirable events. An example of an undesirable event may include the usage of a threshold percentage of storage space at a storage device. However, even if the effects of an undesirable event may be improved by a subsequent action (e.g., the migration of some files away from the storage device at which the undesirable event has occurred), the storage device may still suffer lowered performance for at least a period of time.

BRIEF DESCRIPTION OF THE DRAWINGS

Various embodiments of the invention are disclosed in the following detailed description and the accompanying drawings.

DETAILED DESCRIPTION

Figure 1:
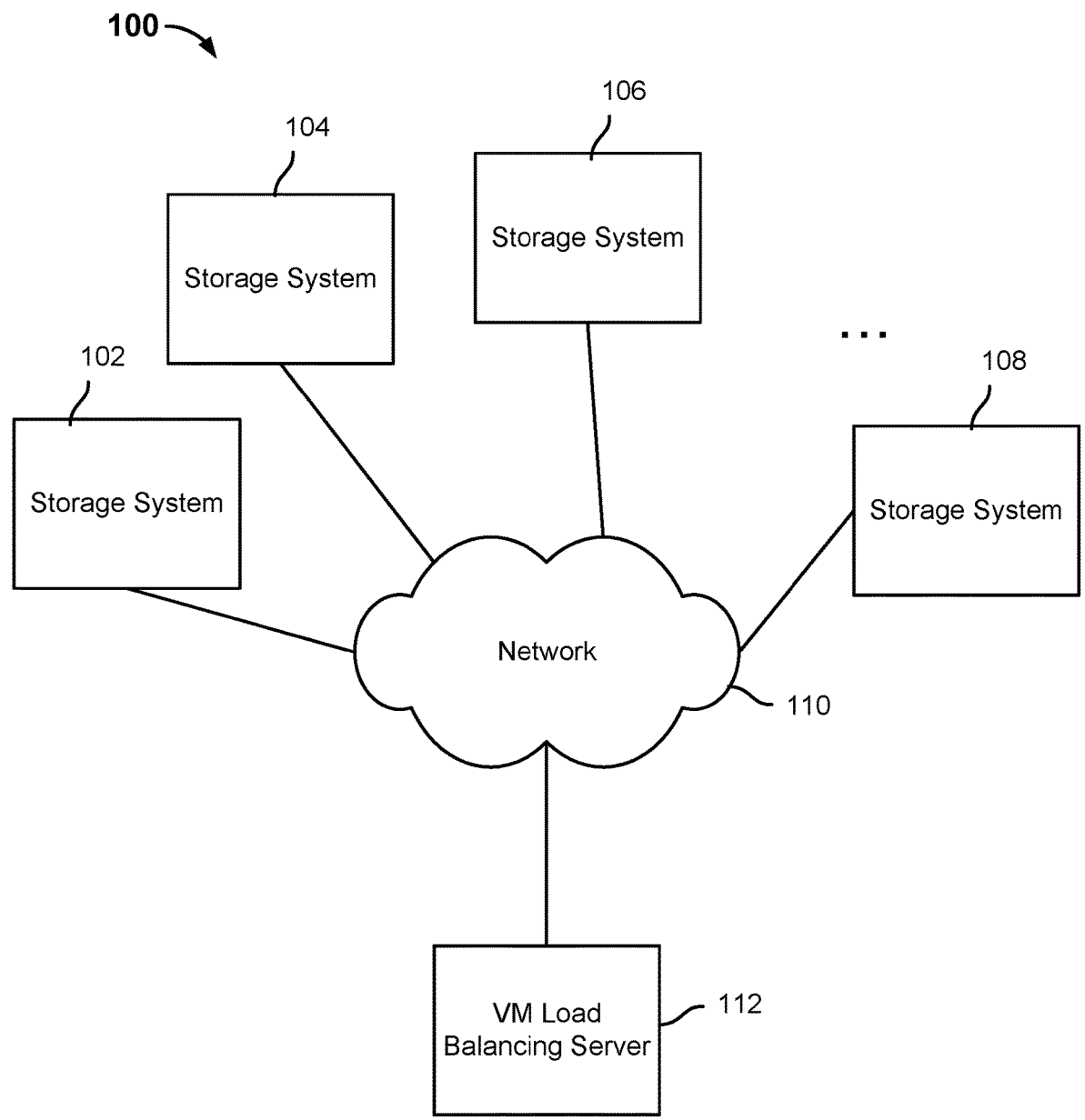
FIG. 1 is a diagram showing an embodiment of a system for performing load balancing using predictive analytics.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of selection of virtual machines (VMs) to move for load balancing are described herein. In some embodiments, a plurality of storage device specific predicted metric data structures corresponding to respective ones of a plurality of storage devices is determined. In various embodiments, the plurality of storage devices belongs to the same "pool" of storage devices. In various embodiments, which two or more storage devices belong to a pool is user defined. For example, storage devices that belong to the same pool may be geographically proximate to each other and/or share another type of common attribute. In various embodiments, a storage device specific predicted metric data structure comprises multiple predicted metrics associated with different metric types (e.g., undesirable events associated with space usage, flash hit rate, and/or load) that have been generated based on the aggregated historical data associated with virtual machines (VMs) stored on a corresponding storage device. In various embodiments, the predicted metrics associated with different metric types that are included in a data structure for a corresponding storage device are stored in the data structure in an order that is associated with the respective priorities of metric types. The plurality of storage device specific predicted data structures corresponding to the respective ones of the plurality of storage devices is combined into a combined predicted metric data structure. In various embodiments, combining the plurality of storage device specific predicted data structures includes combining the predicted metrics of the storage device specific predicted data structures associated with the same metric type (e.g., the same position within the data structures) to determine a combined or pool-level predicted metric associated with that metric type. In various embodiments, the combined predicted metric data structure comprises a pool-level data structure of predicted metrics.

A combined predicted metric to improve is selected from the combined predicted metric data structure that is associated with the plurality of storage devices. The selected combined predicted metric is used to determine a set of VMs to move from a first storage device included in the plurality of storage devices to a second storage device included in the plurality of storage devices such that the selected combined predicted metric to be improved is predicted to be updated to a better value (e.g., a better value that represents a lower probability of risk). As will be described in further detail below, it may be determined and subsequently recommended at a user interface that one or more VMs should be moved from their respective source storage device(s) to a different, destination storage device within the same pool of storage devices because these migrations are predicted to improve at least one predicted combined, pool-level metric. As such, by predicting the future occurrence of undesirable events, VMs may be load balanced among storage devices in a pool to potentially preempt later occurring problems.

FIG. 1 is a diagram showing an embodiment of a system for performing load balancing using predictive analytics. In the example, system 100 includes storage device 102, storage device 104, storage device 106, network 110, storage device 108, and VM load balancing server 112. In various embodiments, network 110 includes various high-speed data networks and/or telecommunications networks. In various embodiments, system 100 includes storage device 102, storage device 104, storage device 106, storage device 108, and VM load balancing server 112 communicate with each other over network 110. In the example, each of storage device 102, storage device 104, storage device 106, and storage device 108 store data related to one or more VMs for which data is currently stored on the respective storage device. Each of storage device 102, storage device 104, storage device 106, and storage device 108 is configured to store historical data at different historical points in time with respect to the VMs that are currently and/or have previously resided at that storage device. In some embodiments, VM load balancing server 112 is configured to keep track of which VMs currently reside at which storage device. In some embodiments, a VM may have data stored at different storage devices and are referred to as "multi-component VMs." In some embodiments, VM load balancing server 112 is configured to store aggregated historical data associated with a multiple-component VM.

At least two of storage device 102, storage device 104, storage device 106, and storage device 108 may be defined by a user to be included in the same pool of storage devices. In various embodiments, a pool of storage devices comprises storage devices that share at least one common attribute (e.g., are located with the same geographic area and/or are owned by the same entity). VM load balancing server 112 is configured to obtain historical data corresponding to various VMs from the storage devices at which the VMs reside and use the historical data to generate predicted metrics for each storage device based on the historical VM data obtained from that storage device. In various embodiments, a "predicted metric" comprises a probability that a particular event, which is sometimes referred to as a "metric type," may occur at any point within a window of time in the future. A predicted metric may comprise a probability that is a single value or a range of probabilities. For example, a metric type may comprise an undesirable event across one or more storage devices and/or an event that is to trigger load balancing of VMs among storage devices of the pool. For example, the historical VM data from the past 30 days may be used to generate a metric within the subsequent seven days. In various embodiments, a user configurable/tunable historical window of time associated with historical VM data may be used to make a predicted metric within a user configurable/tunable future window of time. VM load balancing server 112 is configured to include the predicted metrics generated for each storage device into a data structure that corresponds to that storage device. In some embodiments, the data structure is a vector. In various embodiments, VM load balancing server 112 is configured to include the predicted metrics generated for each storage device into a corresponding data structure such that the position of each predicted metric corresponds to a priority associated with that particular metric type. For example, the predicted metric associated with the highest priority metric type is stored in the first position in the vector, the predicted metric associated with the second highest priority metric type is stored in the second position in the vector, and so forth.

After VM load balancing server 112 has generated a storage device specific predicted metric data structure for each storage device in a pool, VM load balancing server 112 is configured to combine the storage device specific predicted metric data structures associated with the storage devices in the pool into a combined, pool-level predicted metric data structure. For example, storage device 102, storage device 104, storage device 106, and storage device 108 are included in the same pool and so VM load balancing server 112 has generated a storage device specific predicted metric data structure corresponding to each of storage device 102, storage device 104, storage device 106, and storage device 108. Then, VM load balancing server 112 is configured to combine the storage device specific predicted metric data structure corresponding to each of storage device 102, storage device 104, storage device 106, and storage device 108 together to determine a combined, pool-level predicted metric data structure. In various embodiments, combining the storage device specific predicted metric data structures associated with the storage devices in the pool into the combined, pool-level predicted metric data structure includes determining the joint probability of all predicted metrics associated with the same metric type across the storage device specific predicted metric data structures as the combined, pool-level predicted metric for the same metric type. As such, each combined predicted metric of the combined predicted metric data structure represents the predicted probability that the event of the corresponding metric type will happen at any point to any storage device in the pool in a configured window of time in the future.

VM load balancing server 112 will identify one or more predicted metrics within the combined predicted metric data structure that are to be improved. In various embodiments, one or more predicted metrics are determined to be improved by comparing those values to one or more respective threshold values. Similar to predicted metrics, a threshold value can either be a single value or a range of values. For example, if a combined predicted metric is greater than a threshold value associated with the corresponding metric type, then the combined predicted metric is determined to be improved. For example, the combined predicted metric that is to be improved may be a probability (e.g., 78%) that any storage device in the pool is to exceed 98% of its space capacity in the next seven days (e.g., or whichever user configured window of time in the future) exceeding a corresponding threshold value (e.g., 70%).

VM load balancing server 112 is configured to use each combined, pool-level predicted metric that is identified to be improved to select one or more VMs to move/migrate from their current/source storage devices within the pool to a different destination storage device within the pool. Moving the one or more VMs from their current/source storage devices within the pool to a different destination storage device within the pool is predicted to improve at least the identified combined, pool-level predicted metric that is identified to be improved. In the event that a combined, pool-level predicted metric is defined to be a probability that an undesirable event will happen to any storage device within the pool at any time in a configured window of time in the future, "improving" that combined predicted metric includes lowering the probability that the undesirable event will happen (e.g., to be below the threshold value corresponding to that metric type). In various embodiments, it is predicted that moving the one or more VMs from their current/source storage devices within the pool to a different destination storage device within the pool will improve the identified combined, pool-level predicted metric that is identified to be improved based on computing a updated combined, pool-level predicted metric data structure based on a hypothetical ("what-if") scenario in which the historical data of the one or more VMs are removed from their current/source storage device and instead assumed to be already stored at the destination storage device. In some embodiments, VM load balancing server 112 is configured to determine one or more sets of VMs to move to respective destination storage devices within the pool to potentially improve each combined, pool-level predicted metric that is selected to be improved. In some embodiments, VM load balancing server 112 is configured to present the determined sets of VMs and their respective destination storage devices the sets of VMs are determined to move to as one or more recommendations for a user to approve. For example, each recommendation identifies which VMs to move, the source storage devices of the VMs, the destination storage devices of the VMs, and the metric type that the VM migrations are predicted to improve. In response to a user selection to approve a recommendation, VM load balancing server 112 is configured to initiate the migration of the data of the VMs included in the recommendation from their respective source storage device(s) to their destination storage device. In some embodiments, a recommendation may be automatically implemented without any user input/approval. In some embodiments, the actual migration of VM data from one storage device to another may be performed by a hypervisor and/or the source storage device and/or the destination storage device.

In some embodiments, after a recommendation is implemented (i.e., VMs included in the recommendation are migrated between storage devices in the pool), the historical data associated with migrated VMs will be removed from their former/source storage devices and then added to the aggregated historical VM data of their current/destination storage devices such that subsequently generated predicted metrics may be computed based on historical data of only VMs that are actually residing at each storage device. In various embodiments, "aggregated historical VM data" refers to the combination (e.g., sum or other combination) of historical data across one or more VMs that reside at a storage device. In various embodiments, the modified historical data of VMs stored at a storage device is referred to as the "effective" historical data (as opposed to "actual" historical data, which refers to historical data associated with even VMs that do not currently reside at a certain storage device). As such and as will be described in further details below, the aggregated historical data of VMs that is stored at each storage device and used for making predicted metrics comprises aggregated "effective" historical data.

Figure 2:
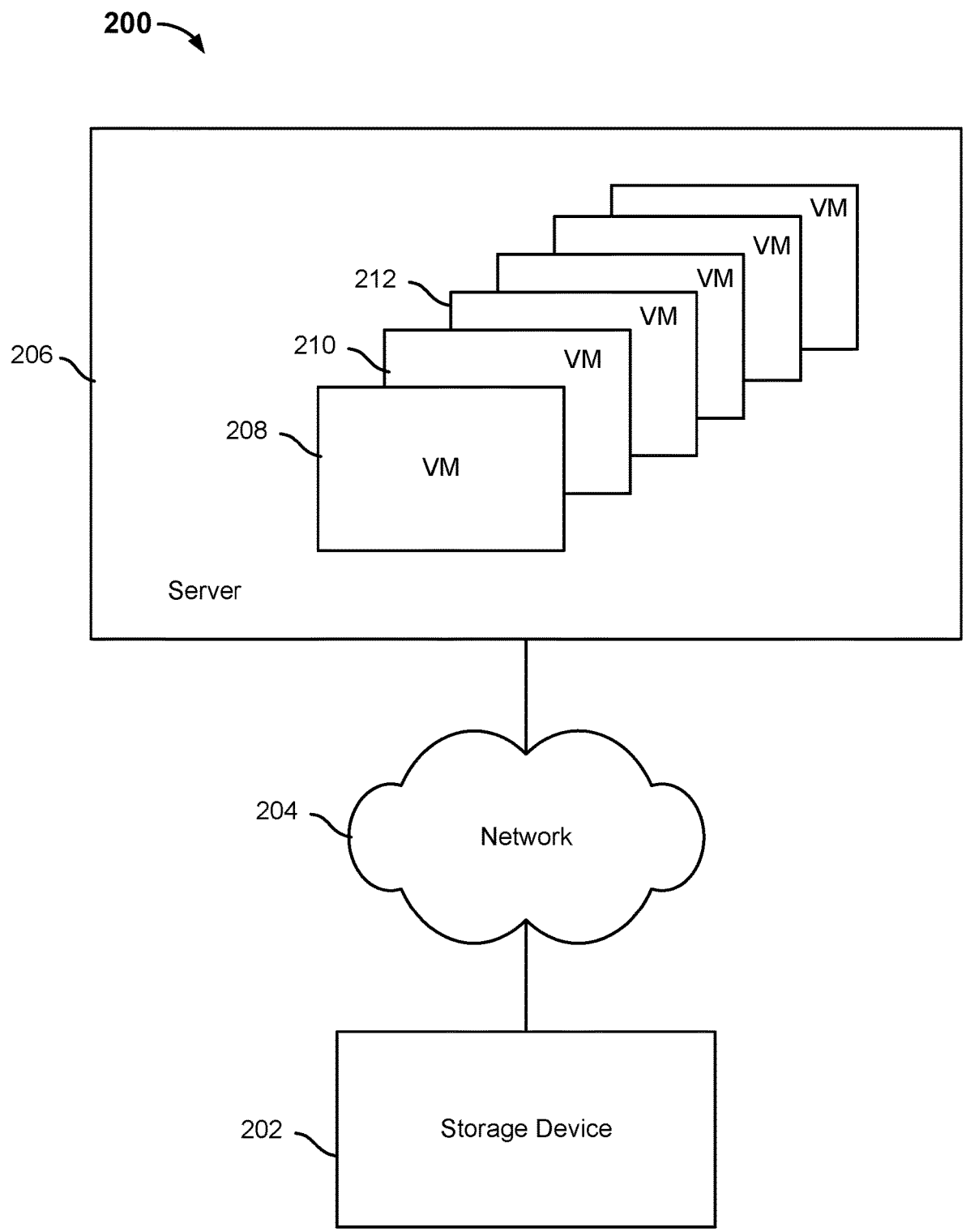
FIG. 2 is a diagram showing an embodiment of a storage device for the storage of VMs using virtual machine storage abstractions.

FIG. 2 is a diagram showing an embodiment of a storage device for the storage of VMs using virtual machine storage abstractions. In the example shown, system 200 includes server 206, network 204, and storage device 202. In various embodiments, network 204 includes various high-speed data networks and/or telecommunications networks. In some embodiments, storage device 202 communicates with server 206 via network 204. In some embodiments, the file system for the storage of VMs using VM storage abstractions does not include network 204, and storage device 202 is a component of server 206. In some embodiments, server 206 is configured to communicate with more storage systems other than storage device 202. Each of storage devices 102, 104, 106, and 108 of system 100 of FIG. 1 may be implemented using a storage device such as storage device 202 of system 200.

In various embodiments, server 206 runs several VMs. In the example shown, VMs 208, 210, and 212 (and other VMs) are running on server 206. A VM is a software implementation of a physical machine that executes programs like a physical machine. For example, a physical machine (e.g., a computer) may be provisioned to run more than one VM. Each VM may run a different operating system. As such, different operating systems may concurrently run and share the resources of the same physical machine. In various embodiments, a VM may span more than one physical machine and/or may be moved (e.g., migrated) from one physical machine to another. In various embodiments, a VM includes one or more virtual disks (vdisks) and other data related to the specific VM (e.g., configuration files and utility files for implementing functionality, such as snapshots, that are supported by the VM management infrastructure). A vdisk appears to be an ordinary physical disk drive to the guest operating the system running on a VM. In various embodiments, one or more files may be used to store the contents of vdisks. In some embodiments, a VM management infrastructure (e.g., a hypervisor) creates the files that store the contents of the vdisks (e.g., the guest operating system, program files and data files) and the other data associated with the specific VM. For example, the hypervisor may create a set of files in a directory for each specific VM. Examples of files created by the hypervisor store the content of one or more vdisks, the state of the VM's BIOS, information and metadata about snapshots created by the hypervisor, configuration information of the specific VM, etc. In various embodiments, data associated with a particular VM is stored on a storage device as one or more files. In various embodiments, the files are examples of VM storage abstractions. In some embodiments, the respective files associated with (at least) VMs 208, 210, and 212 running on server 206 are stored on storage device 202.

In various embodiments, storage device 202 is configured to store meta-information identifying which stored data objects, such as files or other VM storage abstractions, are associated with which VM or vdisk. In various embodiments, storage device 202 stores the data of VMs running on server 206 and also stores the metadata that provides mapping or other identification of which data objects are associated with which specific VMs. In various embodiments, mapping or identification of specific VMs includes mapping to the files on the storage that are associated with each specific VM. In various embodiments, storage device 202 also stores at least a portion of the files associated with the specific VMs in addition to the mappings to those files. In various embodiments, storage device 202 refers to one or more physical systems and/or associated hardware and/or software components configured to work together to store and manage stored data, such as files or other stored data objects. In some embodiments, a hardware component that is used to (at least in part) implement the storage device may be comprised of one or a combination of multiple tiers of storage types. For example, storage device 202 may include tiers of storage types such as hard disk drive (HDD or "disk") and/or solid state drive (SSD or "flash"). In various embodiments, a type of storage is considered to be in a higher tier if it has faster accesses relative to a type of storage that is considered to be in a lower tier. In various embodiments, the higher tier type of storage (e.g., flash storage) at storage device 202 is configured to store more frequently accessed and/or otherwise higher priority VM data and lower tier type of storage (e.g., disk storage) at storage device 202 is configured to store less frequently accessed and/or otherwise lower priority VM data.

Figure 3:
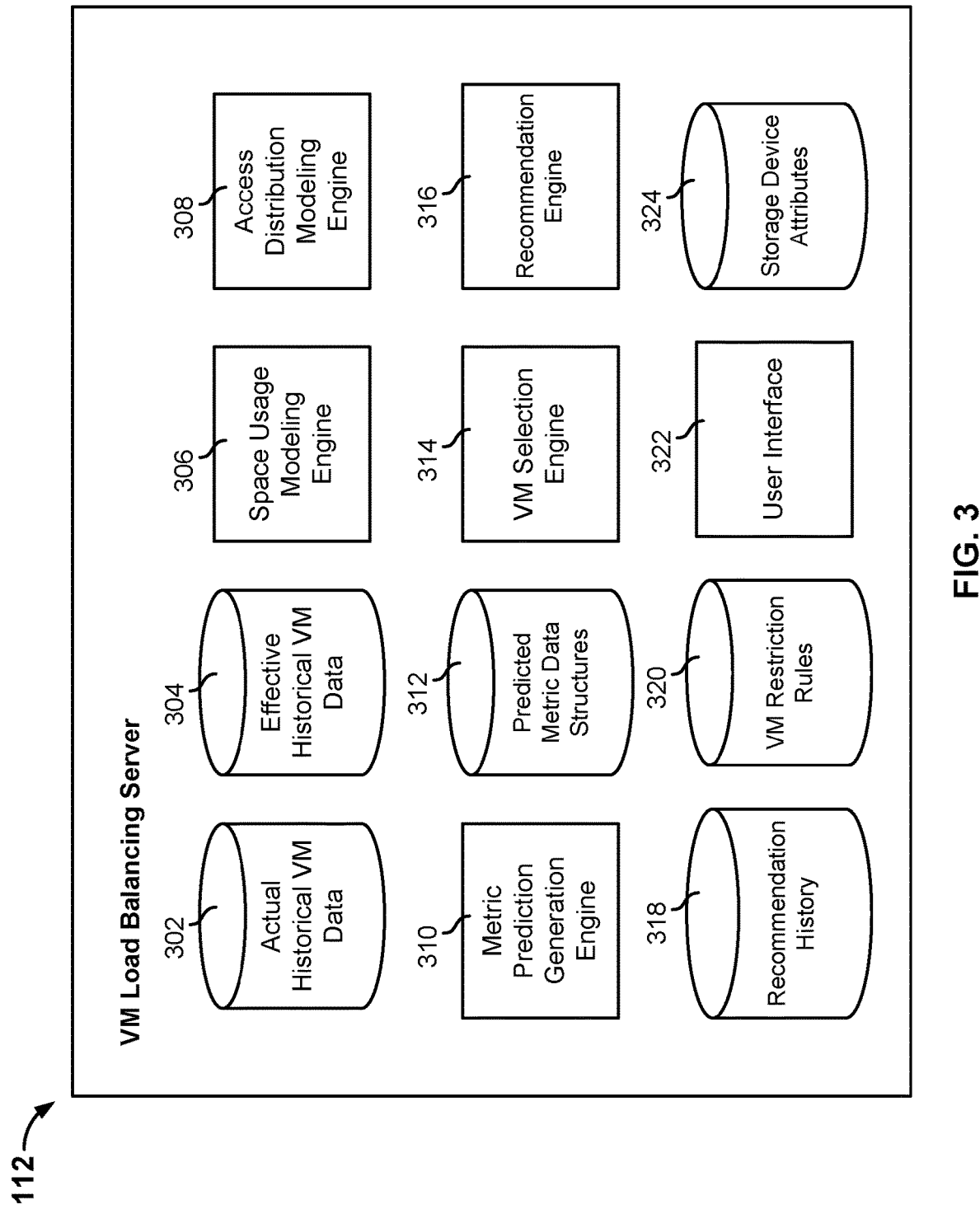
FIG. 3 is a diagram showing an example of a VM load balancing server.

FIG. 3 is a diagram showing an example of a VM load balancing server. In the example VM load balancing server of FIG. 3, the VM load balancing server includes actual historical VM data storage 302, effective historical VM data storage 304, space usage modeling engine 306, access distribution modeling engine 308, metric prediction generation engine 310, predicted metric data structures storage 312, VM selection engine 314, recommendation engine 316, recommendation history storage 318, VM restriction rules storage 320, user interface 322, and storage device attributes 324. In some embodiments, space usage modeling engine 306, access distribution modeling engine 308, metric prediction generation engine 310, VM selection engine 314, recommendation engine 316, and user interface 322 may each be implemented using one or both of hardware and/or software. In some embodiments, actual historical VM data storage 302, effective historical VM data storage 304, predicted metric data structures storage 312, recommendation history storage 318, VM restriction rules storage 320, and storage device attributes 324 may be implemented using one or more databases. In various embodiments, a VM load balancing server may include additional, fewer, and/or different components than those described in FIG. 3.

Actual historical VM data storage 302 is configured to store the actual historical VM data of VMs that have previously resided and/or currently reside on a storage device. In various embodiments, the VM load balancing server is configured to generate predicted metrics for storage devices in a pool and then to generate recommendations of which sets of VMs to move from their source storage devices to a destination storage device within the same pool in order to improve a combined, pool-level predicted metric. Examples of actual historical VM data comprise performance attributes (e.g., storage space usage and load), how much of a VM's data is stored in disk versus flash, and/or how many times each VM's block in disk/flash has been accessed. In some embodiments, actual historical VM data storage 302 is configured to store, for each VM, a historical attribute value at each predetermined historical interval for a predetermined length of time. An example historical attribute value is space usage and as such, actual historical VM data storage 302 may store a space usage attribute value corresponding to how much space each VM at the storage device at which it is residing consumes on each day of a window of time in the past. In some embodiments, if a VM has data that is stored across multiple storage devices, then actual historical VM data storage 302 is configured to store the aggregated historical attribute value of the multi-component VMs across the multiple storage devices at each predetermined historical interval for a predetermined length of time. In some embodiments, at least some of the actual historical VM data corresponding to a VM is also stored at each storage device that stores data of that VM.

Effective historical VM data storage 304 is configured to store the effective historical data of VMs that currently reside on a storage device. Examples of effective historical VM data comprise performance attributes (e.g., storage space usage and load) and also how much of a VM's data is stored in disk versus flash and/or how many times each VM's block in disk/flash has been accessed. As mentioned above, after a VM is moved from its source storage device to a destination storage device (e.g., as a result of a user approving a recommendation that includes such a move), the effective historical VM data at each of the source storage device and the destination storage device is updated. At the source storage device, the historical VM data of the migrated VM is removed. For example, if "VM-123" had been moved off of a source storage device and the source storage device had stored a historical space usage attribute value corresponding to "VM-123" at each predetermined historical interval (e.g., day) for a predetermined length of time (e.g., at least 30 days), then the historical space usage attribute value corresponding to "VM-123" would either be discarded from the source storage device or at least indicated to be ignored in making predicted metrics for the source storage device. Similarly, for example, the historical space usage attribute value corresponding to "VM-123" at each predetermined historical interval (e.g., day) for a predetermined length of time that was previously stored at the former source storage device is then added to the destination/current storage device. The purpose of updating the effective historical VM data at the source and destination storage devices after a VM migration is so that the updated effective historical VM data at each storage device could accurately reflect the historical data of VMs that currently reside on the storage device (and not that of VMs that no longer currently reside on the storage device). As such, the effective historical VM data at a storage device may be used to make accurate predicted metrics for the storage device. In some embodiments, at least some of the effective historical VM data corresponding to a VM is also stored at each storage device on which the VM resides.

Space usage modeling engine 306 is configured to generate predicted metrics related to space usage related metric types. In some embodiments, space usage modeling engine 306 is configured to input the effective historical VM data related to space usage at each storage device (e.g., how much aggregated storage space one or more VMs that currently reside at the storage device consume) (e.g., that is stored either at the storage device and/or at effective historical VM data storage 304) from a configured historical window of time (e.g., the past 30 days) into one or more statistical models. In some embodiments, space usage modeling engine 306 is configured to input historical non-VM data related to space usage at each storage device from a configured historical window of time to identify non-VM related space usage trends as well. As such, VMs may be recommended to be moved between storage devices to load balance (e.g., free up storage resources at the source storage devices) even when the VMs themselves may not be the source of space growth. The one or more statistical models use at least a subset of the input effective historical VM data related to space usage to output various predictions of predicted VM space usage for the VM(s) at the storage device (e.g., how much aggregated storage space one or more VMs that currently reside at the storage device is predicted to consume) at any point in time in a configured window of time in the future (e.g., the next seven days). The outputs from the statistical models may be sorted and the sorted distribution of predicted VM space usage at the storage device may be used to generate the predicted metric at the storage device corresponding to one or more space usage related metric types. For example, example space usage related metric types are the probability that 100% of the space at the storage device is predicted to be consumed at any time within the next seven days, the probability that 98% of the space at the storage device is predicted to be consumed at any time within the next seven days, and the probability that 95% of the space at the storage device is predicted to be consumed at any time within the next seven days. In some embodiments, the predicted metric (the probability) corresponding to a space usage related metric type (e.g., the probability that 100% of the space at the storage device is predicted to be consumed at any time within the next seven days) may be a range of probabilities/percentages that is determined by adding and/or subtracting an interval from a single value that is determined from sorted distribution of predicted VM space usage at the storage device.

In some embodiments, space usage modeling engine 306 is configured to generate updated space usage related metric types by using the aggregated effective historical VM data of a storage device in addition to the data of a VM that is a candidate to be moved to the storage device in order to model predicted metrics at the storage device (and also combined predicted metrics for the pool for which the storage device belongs) should that candidate VM be moved to that storage device. Similarly, in some embodiments, space usage modeling engine 306 is configured to generate space usage related metric types by using the aggregated effective historical VM data of a storage device less the data of a VM that is a candidate to be moved off the storage device in order to model predicted metrics at the storage device (and also combined predicted metrics for the pool for which the storage device belongs) should that candidate VM be moved off that storage device.

Access distribution modeling engine 308 is configured to generate predicted metrics related to access rate related metric types. In some embodiments, a storage device includes at least a higher tier of storage comprising flash and at least a lower tier of storage comprising disk. In some embodiments, the flash storage is configured to store frequently accessed and/or otherwise higher priority data and the disk storage is configured to store less frequently accessed and/or otherwise lower priority data. In some embodiments, due to the higher cost of flash (or another higher tier of storage associated with faster accesses), the amount of flash in a storage device is limited and typically entirely consumed (e.g., up to the configured allotted/maximum percentage of flash space) for storing VM data. The remaining VM data that is not serviced by flash and/or is evicted from flash at a storage device is stored at disk at the storage device. In some embodiments, the amount of the disk (or another lower tier of storage associated with faster accesses) is less limited than flash and is able to store data that does not meet the criteria for being stored in flash. In some embodiments, access distribution modeling engine 308 is configured to use the aggregated effective historical VM data related to accesses made at flash and disk at each storage device (e.g., how many times each flash block was accessed and how many times disk was accessed) (e.g., that is stored either at the storage device and/or at aggregated effective historical VM data storage 304) from a configured historical window of time (e.g., the past seven days) to model a distribution of flash and disk at the storage device. Access distribution modeling engine 308 is configured to determine a measured "flash hit rate" at the storage device based on the aggregated effective historical VM data (e.g., of the past seven days). In various embodiments, the "flash hit rate" refers to the percentage of accesses at the storage device that were serviced by flash (i.e., the percentage that requested data was found in flash). In various embodiments, the "flash miss rate" refers to the percentage of accesses at the storage device that was serviced by disk (i.e., the percentage that requested data was found in disk). The relationship between the flash hit rate and the flash miss rate is such that their sum is always 1. Example access rate metric types are the maximum between the flash miss rate and 3%, the maximum between the flash miss rate and 1%, and the maximum between the flash miss rate and 0.1%.

In some embodiments, access distribution modeling engine 308 is configured to use the measured flash hit rate and the measured access distribution across flash and disk to determine a prediction parameter (which is sometimes referred to as the "d" parameter) that comprises a probability of access of the most frequently accessed block in disk at the storage device. Then, in modeling the updated access rate related predicted metrics in response to a hypothetical (what-if) addition of a VM to the storage device or the hypothetical removal of a VM from the storage device, in some embodiments, access distribution modeling engine 308 is configured to use the "d" parameter that was previously computed for the storage device to determine the updated flash hit rate (or flash miss rate). In some embodiments, access distribution modeling engine 308 is configured to generate an updated access rate related metric type by using the aggregated effective historical VM data of a storage device in addition to the data of a VM that is a candidate to be moved to the storage device in order to model predicted metrics at the storage device (and also combined predicted metrics for the pool for which the storage device belongs) should that candidate VM be moved to that storage device. Similarly, in some embodiments, access distribution modeling engine 308 is configured to generate updated access rate related metric types by using aggregated effective historical VM data of a storage device less the data of a VM that is a candidate to be moved off the storage device in order to model predicted metrics at the storage device (and also combined predicted metrics for the pool for which the storage device belongs) should that candidate VM be moved off that storage device.

Metric prediction generation engine 310 is configured to generate a storage device specific predicted metric data structure corresponding to each storage device. In some embodiments, the storage device specific predicted metric data structure comprises a vector (e.g., a one-dimensional array). In various embodiments, metric prediction generation engine 310 is configured to include/insert the predicted metrics that were generated (e.g., by space usage modeling engine 306 and/or access distribution modeling engine 308) for the storage device in a corresponding storage device specific predicted metric data structure. In various embodiments, metric prediction generation engine 310 is configured to include the predicted metrics in the corresponding storage device specific predicted metric data structure in a manner such that each predicted metric is included in the data structure at a position associated with a priority corresponding to the metric type of that predicted metric. For example, the predicted metric associated with the metric type that is associated with the highest priority is included in the element that is associated with the lowest index/first position of the vector, the predicted metric associated with the metric type that is associated with the second highest priority is included in the element that is associated with the second lowest index/second position of the vector, and so forth. In some embodiments, metric prediction generation engine 310 is configured to store the storage device specific predicted metric data structures at predicted metric data structures storage 312.

Metric prediction generation engine 310 is further configured to combine the storage device specific predicted metric data structure corresponding to each storage device that is associated with a pool of storage devices into a combined, pool-level predicted metric data structure. In some embodiments, the combined, pool-level predicted metric data structure comprises a vector (e.g., a one-dimensional array). In various embodiments, to determine the combined, pool-level predicted metric data structure, metric prediction generation engine 310 is configured to determine the joint probability among the predicted metrics of the same metric type corresponding to the storage device specific predicted metric data structures corresponding to all storage devices of the pool. Metric prediction generation engine 310 is configured to include/insert each joint probability corresponding to each metric type into the combined, pool-level predicted metric data structure at a position associated with a priority corresponding to the metric type. For example, the combined predicted metric (e.g., the joint probability) of the storage device specific predicted metrics associated with the metric type of the highest priority may be included in the element that is associated with the lowest index/first position of the vector, the combined predicted metric of the storage device specific predicted metrics associated with the metric type of the second highest priority may be included in the element that is associated with the second lowest index/ second position of the vector, and so forth. In some embodiments, metric prediction generation engine 310 is configured to store the combined, pool-level predicted metric data structure corresponding to each pool at predicted metric data structures storage 312.

VM selection engine 314 is configured to select sets of VMs to move from their source storage device(s) to destination storage device(s) within the same pool of storage devices. In various embodiments, VM selection engine 314 is configured to compare each combined predicted metric of a combined predicted metric data structure associated with a pool to a predetermined threshold value associated with the corresponding metric type. In the event that the combined predicted metric exceeds the predetermined threshold value, then the combined predicted metric (and its associated metric type) is identified as one that is to be improved. For example, each predetermined threshold value comprises a high probability of the occurrence of the metric type (e.g., an undesirable scenario or event). In some embodiments, VM selection engine 314 is configured to determine candidate sets of VMs to move off their current source storage device(s) such that by doing so, the updated combined predicted metric of one or more metric types associated with combined predicted metrics may be improved (e.g., their probabilities may be lowered below the predetermined threshold values). In some embodiments, VM selection engine 314 is configured to determine which destination storage device to move a candidate set of VMs such that by doing so, the updated combined predicted metrics improve over their current values, with preference given to improving those combined predicted metrics associated with metric types associated with higher priorities. In some embodiments, VM selection engine 314 is configured to use user configured rules and/or other rules in VM restriction rules storage 320 (e.g., rules that determine which VMs can or cannot be moved to and from) to constrain the search for which sets of VMs to move and how. In some embodiments, VM selection engine 314 is configured to use storage device attributes (e.g., maximum capacity, flash capacity, compression/dedupe capabilities, and maximum normalized IOPS) stored at storage device attributes storage 324 to constrain the search for which sets of VMs to move and how. In some embodiments, VM selection engine 314 is further configured to use the relative performance of each storage device to other storage devices within the same pool to constrain the search for which sets of VMs to move and how. In some embodiments, a metric of "performance reserves" is computed by each storage device as a measure of its available performance capacity. In some embodiments, the performance reserves of a storage device are shown on a scale of 0 to 100%. Some storage devices have greater performance, so when moving a VM, the performance reserves need to be re-evaluated in terms of their impact on the new storage device. Re-evaluating performance reserves is performed by constructing the effective data from the source of the performance reserves computation (e.g., IOPS and throughput measurements) rather than previously determined performance reserves themselves. In another example, the performance reserves may also be scaled up and down based on the relative capacities of the storage device models. This is just a scaling factor associated with each model, and so would be similar to other storage device attributes like maximum capacity. In some embodiments, VM selection engine 314 is configured to cause space usage modeling engine 306 and access distribution modeling engine 308 to respectively generate updated storage device specific predicted metrics for different hypothetical/candidate migrations of sets of VMs between storage devices of the same pool. In some embodiments, VM selection engine 314 is configured to cause metric prediction generation engine 310 to generate updated combined predicted metrics for different hypothetical/candidate migrations of sets of VMs between storage devices of the same pool. In some embodiments, VM selection engine 314 is configured to send a selection of a set of VMs to move from their source storage device(s) to a destination storage device to recommendation engine 316.

Recommendation engine 316 is configured to generate a set of recommendations that includes selections of one or more sets of VMs to be moved from their current storage device(s) to respective new destination storage device(s) within the same pool. In some embodiments, each recommendation identifies the VMs to move, the source storage device(s) of the VMs, the destination storage device(s) of the VMs, and the expected benefit of the migration (e.g., the combined predicted metric of which metric type is predicted to be improved as a result of the migration). Recommendation engine 316 is configured to store the set of recommendations in recommendation history storage 318. In various embodiments, recommendation engine 316 is configured to cause a set of recommendations to be presented at user interface 322. A user may approve of one or more recommendations to be implemented via a selection at user interface 322. A user may also reject one or more recommendations to be implemented via a selection at user interface 322. Recommendation engine 316 is configured to initiate the implementation of the VM migration(s) associated with each of one or more user approved recommendations by, for example, sending data to a hypervisor associated with the VM(s) to migrate and/or a storage device from which the VM(s) are to be moved from/to.

Recommendation engine 316 is configured to periodically determine whether a recommendation that is presented at user interface 322 is still valid. In some embodiments, recommendation engine 316 may determine whether any circumstances changed since a recommendation was generated such that it would no longer be available to be implemented. For example, a deletion of a VM that is included in a recommendation may cause that recommendation to become invalidated. Invalidated recommendations may be removed from being presented at user interface 322 and in some embodiments, the invalidation of a recommendation may trigger the presentation of a previously generated but not presented recommendation and/or the presentation of a new, alternative recommendation.

Recommendation history 318 is configured to store a history of previously generated recommendations. Recommendation history 318 may also store data indicating which historical recommendations were approved by a user to be implemented, which recommendations were not approved, and which recommendations were invalidated (and for which reason). In some embodiments, recommendation engine 316 is configured to periodically determine whether the combined predicted metrics associated with historical recommendations (whether they were approved to be implemented or not) matched the subsequent actual combined metrics of each pool of storage devices. The determined accuracy of the historical recommendations may be used to improve subsequent metric predictions.

Figure 4:
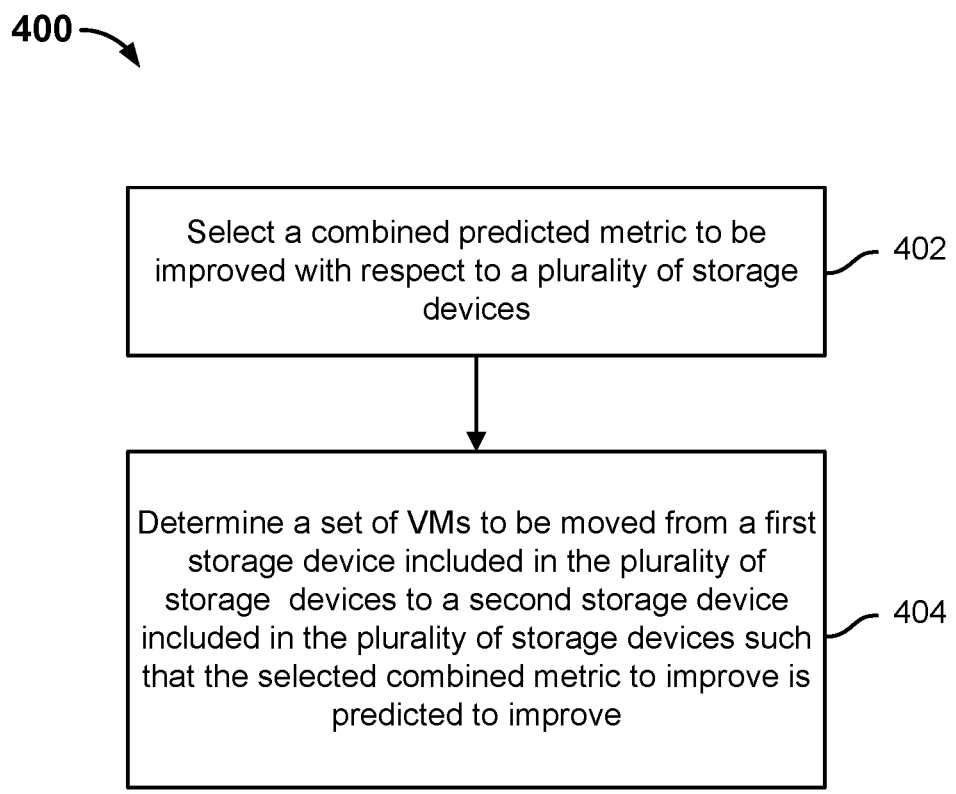
FIG. 4 is a flow diagram showing an embodiment of a process for selecting VMs to move for load balancing.

FIG. 4 is a flow diagram showing an embodiment of a process for selecting VMs to move for load balancing. In some embodiments, process 400 is implemented by VM load balancing server 112 of system 100 of FIG. 1.

At 402, a combined predicted metric to be improved with respect to a plurality of storage devices is selected. In various embodiments, the plurality of storage devices refers to a pool of storage devices. In some embodiments, predicted metrics associated with various metric types are determined for each storage device based on at least a portion of the aggregated effective historical VM data of one or more VMs that are stored at each storage device. As will be described in further detail below, aggregated effective historical VM data stored at each storage device reflects the historical VM data of only the VMs that are currently residing at the storage device. For example, the historical VM data of only the VMs that are currently residing at the storage device from the past 30 days are used to generate the predicted metrics. Examples of metric types include space usage, flash hit rate, and/or load.

In some embodiments, storage device specific predicted metrics of the same type are then combined to determine a combined predicted metric corresponding to that metric type. In some embodiments, each combined predicted metric is compared to a predetermined threshold value associated with the corresponding metric type. In the event that a combined predicted metric exceeds a corresponding predetermined threshold value, the combined predicted metric is selected as a "combined predicted metric to improve" and used as a basis for performing load balancing of VMs across the storage devices of the pool.

At 404, a set of VMs to be moved from a first storage device included in the plurality of storage devices to a second storage device included in the plurality of storage device is determined such that the selected combined predicted metric to be improved is predicted to improve. A set of one or more VMs will be moved from their source storage device(s) to a different, destination storage device within the same pool. As will be described in further detail below, the set of one or more VMs is selected such that the collective/aggregate size of the set of the one or more VMs is of a statistically significant size and that the migration of the set of VMs off of their source storage device(s) and to the destination storage device results in an updated predicted metric associated with the metric type of the combined predicted metric, which had been selected as a basis for performing load balancing, that is improved over the selected combined predicted metric.

In some embodiments, affinity rules that describe where a VM may or may not reside (e.g., VM-123 is to always reside at Storage Device A) may be configured by a user. Stored affinity rules, if any, are followed in the determination of where to move a set of VMs within the pool of storage devices.

Below are two example challenges to solve in selecting VMs to move for load balancing:

1. Picking the correct set of VMs to move from a potentially large set of VMs and destination storage devices. As will be described in further detail below, before a VM is recommended to be moved from its source storage device to a destination storage device, all possible moves of formed sets of VMs to all possible destination storage devices are evaluated and the best move of a particular set of VMs to a particular destination storage device is identified based on its predicted improvement to a pool-level combined predicted metric that is selected to improve. The problem is one of scale—there are many VMs and many combinations to search them exhaustively in this ideal way 2. Picking a set of one or more VMs to move from their source storage devices to a destination storage device that produce a statistically significant result, even if each individual VM is too small to make a distinct prediction in future space or I/O load usage.

Each potential move of a set of VMs to a candidate destination storage device requires re-running a statistical model which is relatively expensive in CPU usage. It may also require re-reading information from a performance database, which is expensive in I/O. Thus, the goal is to find a heuristic technique which minimizes the total cost of computation while still having an acceptable cost of running.

Figure 5:
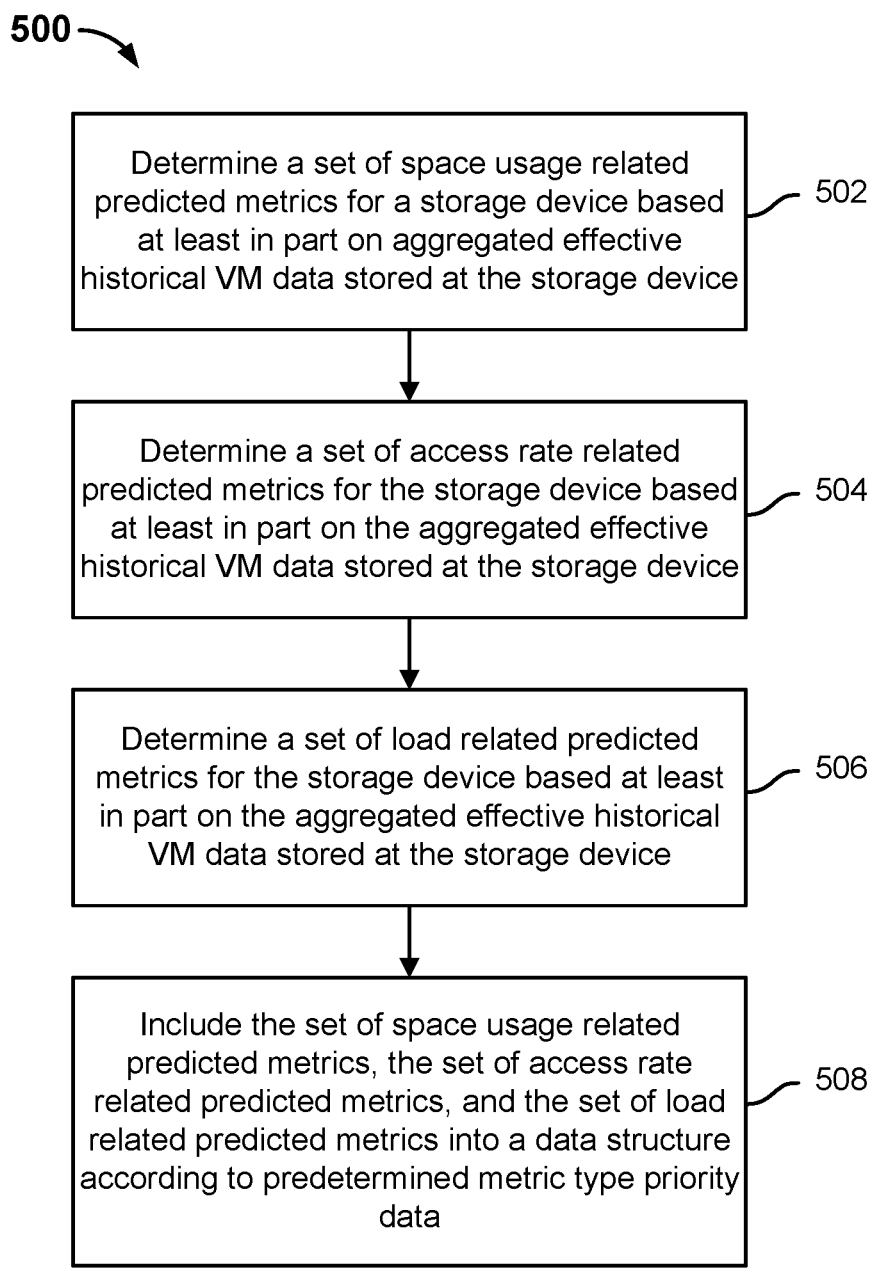
FIG. 5 is a flow diagram showing an embodiment of a process for determining a storage device specific predicted metric data structure.

FIG. 5 is a flow diagram showing an embodiment of a process for determining a storage device specific predicted metric data structure. In some embodiments, process 500 is implemented by VM load balancing server 112 of system 100 of FIG. 1. In some embodiments, 402 of process 400 of FIG. 4 is implemented at least in part using process 500.

At 502, a set of space usage related predicted metrics is determined for a storage device based at least in part on aggregated effective historical VM data stored at the storage device.

In various embodiments, the aggregated effective historical aggregated storage capacity (e.g., over the past 30 days or another configured period of time in the past) that was consumed by the one or more VMs that currently store data at a storage device is determined. For example, the historical aggregated storage capacity comprises a data point at each day (e.g., or another predetermined interval), where each data point represents a total amount of storage space that is used by the one or more VMs that store data at the storage device on that particular day.

In some embodiments, the aggregated effective historical storage capacity data is input into one or more statistical models that are configured to produce various predictions, based on the input data, on how much aggregated storage capacity will be consumed by the VMs at the storage device (e.g., at any point during the next seven days or another configured period of time in the future). At least a subset of the predictions will be sorted into a cumulative distribution function and predicted metrics corresponding to various space usage related metric types may be determined. Examples of space usage related metric types are space usage thresholds for which predicted metrics are computed as the percentage of predictions that are above the threshold of a metric type.

Table 1 below includes example thresholds for space usage metric types:

TABLE 1

| Metric Type Name | Space Usage Threshold |
| --- | --- |
| space_threshold_100 | 100% of storage device physical capacity |
| space_threshold_snapshots | 98% of storage device physical capacity |
| space_threshold_replicas | 95% of storage device physical capacity |
| space_threshold_90 | 90% of storage device physical capacity |
| space_threshold_80 | 80% of storage Device physical capacity |

In some embodiments, the predicted metrics are bounded at 1%. In some embodiments, the predicted metrics are also bounded above at 99% so that the pool metric does not saturate at 1.

In some embodiments, a space usage related predicted metric comprises a single value (a probability). In some embodiments, a space usage related predicted metric comprises a range of values (e.g., a range of probabilities, which is sometimes referred to as a "confidence interval"). For example, the confidence interval may be determined based on a Wilson interval and the computed percentage of predictions that is greater than a space threshold of a metric type. For example, the confidence interval may be determined based on adding to and also subtracting from the computed percentage of predictions that is greater than a space threshold of a metric type.

At 504, a set of access rate related predicted metrics for the storage device is determined based at least in part on the aggregated effective historical VM data stored at the storage device.

In various embodiments, the aggregated effective historical flash accesses and disk accesses (e.g., over the past seven days or another configured period of time in the past) that were made for requests to the one or more VMs that currently store data at a storage device are determined. For example, the historical aggregated flash accesses and disk accesses comprise a histogram of how many accesses were made to each block in flash and each block in disk (or any block in disk) in the past seven days. In some embodiments, the measured flash hit rate associated with the past seven days may be determined as the number of accesses to flash divided by the sum of the number of accesses to flash plus the number of accesses to disk. In some embodiments, the measured flash miss rate is determined by subtracting the flash hit rate from one (or determining the number of accesses to disk divided by the sum of the number of accesses to flash plus the number of accesses to disk). Examples of access rate related metric types include the greater of the measured flash miss rate and a predetermined flash miss rate (e.g., the maximum function with the measured flash miss rate and a predetermined flash miss rate as arguments).

Table 2 below includes example thresholds for access rate metric types:

TABLE 2

| Metric Type Name | Computation |
| --- | --- |
| flash_overcommit_97 | max( miss_rate, 0.03 ) |
| flash_overcommit_99 | max( miss_rate, 0.01 ) |
| flash_overcommit_999 | max( miss_rate, 0.001 ) |

At 506, a set of load related predicted metrics for the storage device is determined based at least in part on the aggregated effective historical VM data stored at the storage device.

In various embodiments, the read and write IOs per second (IOPS) and read and write bytes per second (throughput) are the main historical data that is used to calculate load. In some embodiments, one or more of additional measurements such as average block size, or measures of compressibility and dedupability of the data, can also be used to build a more sophisticated measure of the load placed on each storage device.

The selected inputs are combined into a single "load" measure that nominally ranges from 0 to 100% (though in some cases it could exceed 100%), where 100% is the maximum expected performance of the array.

The metrics based on this measure are "percent of time periods that were over a given load value." Examples of a given load value include 40%, 60%, and 80% load. For example, load_60 metric is max(time periods over 60% load/the number of time periods in training period, 0.01).

At 508, the set of space usage related predicted metrics, the set of access rate related predicted metrics, and the set of load related predicted metrics are included in a data structure according to predetermined metric type priority data.

In various embodiments, each determined predicted metric (e.g., space usage related, access rate related, and load related) is inserted into a data structure corresponding to the storage device in a manner in which a predicted metric is added to an element of the data structure that reflects the priority associated with the corresponding metric type. For example, the data structure corresponding to the storage device is a vector (e.g., a one-dimensional array), in which case the predicted metric associated with the highest priority metric type may be included in the first element of the vector, and the second highest priority metric type may be included in the second element of the vector, and so forth.

The following are example priorities and related goals, listed from highest to lowest priorities:

1. Space capacity. Ensure that no storage device runs out of space (e.g., prevents the scenario in which a storage device has 100% of its storage capacity consumed). If a message associated with insufficient space capacity is returned to the hypervisor in response to a write to a VM, then the VM experiences an I/O error. Usually, the I/O error will cause the VM to stop functioning and requires an immediate intervention.

2. Data protection. Preserve data protection policies (e.g., replication, snapshot, high-frequency snapshots). In some embodiments, a storage device will cease taking snapshots above a threshold space usage (e.g., 98%) and cease accepting replicas above a lower space threshold (e.g., 95%). If the VM cannot be snapshotted or replicated due to resource constraints, the user may experience data loss at a later date.

3. Guaranteed Quality-of-Service (QoS). Ensure that VMs which have guaranteed QoS can receive the desired minimum normalized IOPS. If a VM experiences high latency due to contention for resources with other VMs, the end user may see application slowdown should the system be oversubscribed. If the storage device user is a service provider, then the service provider's customers are not receiving the guaranteed "floor" that they have paid for. This situation, while requiring attention, typically does not require as high a level of escalation as missed backups or malfunctioning VMs that are associated with a lack of storage space.

4. Best-effort QoS. Attempt to reduce the number of flash misses by analyzing working-set behavior and moving VMs to where there is available flash. VMs that experience high latency but have no QoS protection are still undesirable. The goal is that as long as resources exist somewhere within the pool, no VM should suffer. For example, the VM load balancing server should seek to avoid flash misses.

5. Topology-induced latency. An attempt to eliminate "hot spots" of high IOPS or throughput. Provide consistent performance to VMs. VMs should ideally be placed so that their network connection to the host they are running on is good. For example, it is not desirable to move a VM to a separate rack from its storage.

In various embodiments, each of the above user priorities match up with one or more metric types for which predicted metrics are included in a predicted metric data structure. In some embodiments, user priority 2) corresponds to two different thresholds in a predicted metric data structure: snapshots stopping, and replication stopping. User priority 4) mentions only flash explicitly, but load metrics also seek to satisfy these user requirements, so, in some embodiments, user priority 4) matches 4 metric types in a predicted metric data structure.

In some embodiments, low-priority versions of these metrics (with lower thresholds) are added in a predicted metric data structure to aid in tiebreaking.

In some embodiments, users of a pool of storage devices may be enabled to configure different priorities and/or relative priorities for their pool.

Figure 6:
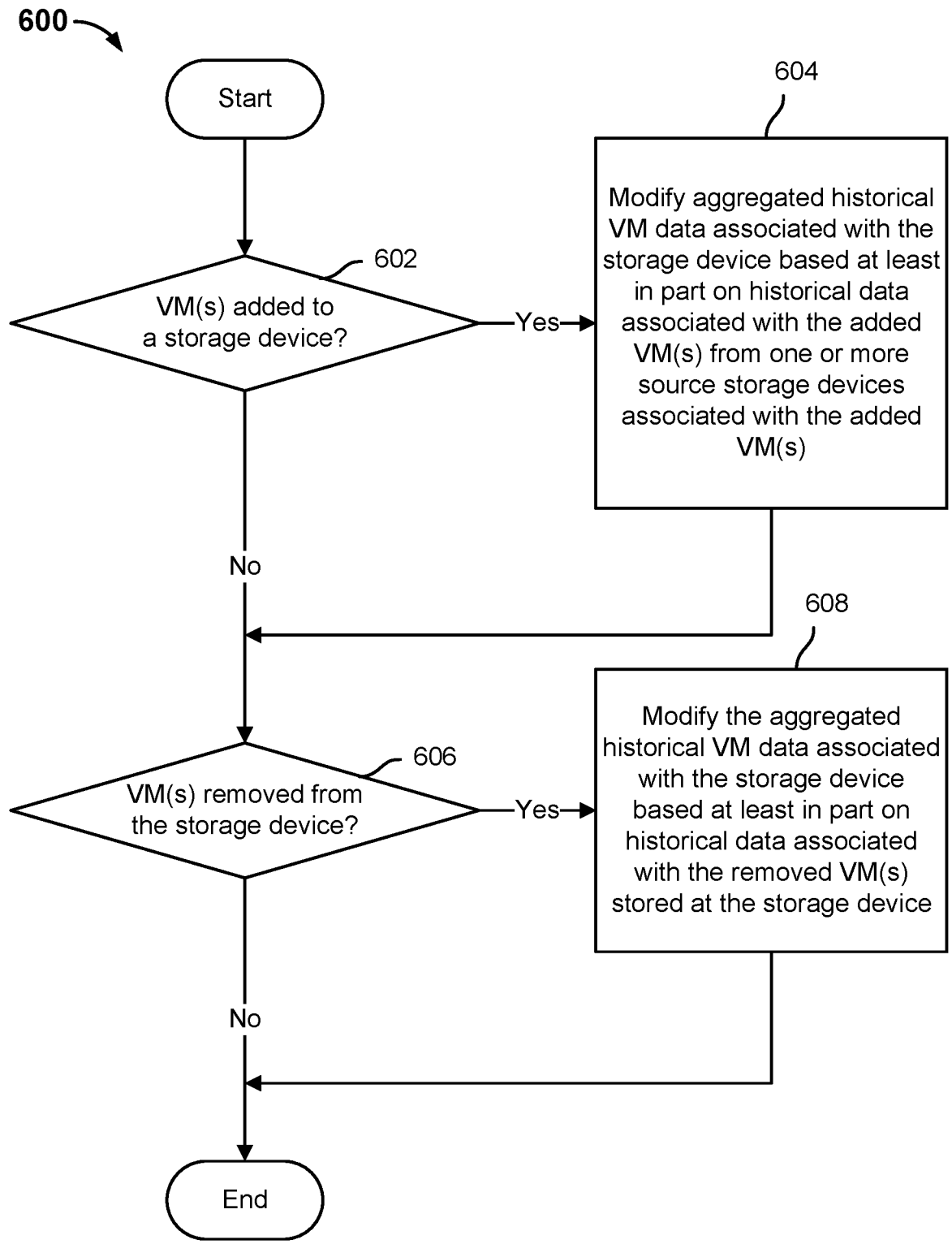
FIG. 6 is a flow diagram showing an embodiment of a process for determining the effective historical VM data at a storage device.

FIG. 6 is a flow diagram showing an embodiment of a process for determining the effective historical VM data at a storage device. In some embodiments, process 600 is implemented by VM load balancing server 112 of system 100 of FIG. 1.

In some embodiments, process 600 is performed subsequent to the completion of migrating one or more VMs within a pool in response to a user approval of a recommendation and/or prior to generating predicted metrics in a load balancing process across a pool at a particular storage device of the pool. For example, a recommendation was presented to a user to move VM(s) from a first storage device to a second storage device within a pool, and the user approved the recommendation. As a result of the user approving the recommendation, the VM(s) included in the recommendation were moved to their respective destination storage device that was identified in the recommendation. After the VMs were moved, the resource usage on the source storage device goes down, and usage on the destination storage device goes up. But, if these changes are not taken into account in making subsequent predicted metrics at either or both of the source and destination storage devices, then the original problem (e.g., a lack of storage space) may still appear to exist on the source storage device, and the destination storage device may appear to have more available storage space than it actually is. As such, a process such as process 600 is used, in various embodiments, so that metric predictions may be computed on the "effective" history of a storage device, with the effects of completed VM storage migration(s) taken into account. As will be described in further detail with process 600, the effective historical VM data at a storage device is determined by:

Subtracting out the (e.g., accesses in flash, space usage) contributions of the moved VM from every historical data point (e.g., within a configured window of time in the past) prior to its move from the source storage device.

Adding in the (e.g., accesses in flash, space usage) contributions of the moved VM to every data historical data point (e.g., within a configured window of time in the past) prior to its move on the destination storage device.

Then, for example, the trend and variability of the space usage on the destination storage device of the moved VM may be incorporated into future predictions.

At 602, it is determined if VM(s) have been added to a storage device. In the event that VM(s) have been added to the storage device, control is transferred to 604. Otherwise, in the event that no VM(s) have been added to the storage device, control is transferred to 606. At 602, the storage device for which process 600 is performed is a destination storage device for the newly added VM(s). VM(s) may have been added by a VM migration (e.g., that resulted from a user approval of a VM load balancing recommendation).

At 604, aggregated historical VM data associated with the storage device is modified based at least in part on historical data associated with the added VM(s) from one or more source storage devices associated with the added VM(s). Historical data (e.g., space usage, access rate, and/or load) associated with each added VM is obtained from the source storage device from which that VM was moved from and then added to the aggregated historical VM data that is stored at the storage device. In some embodiments, certain types of data obtained for added VM(s) may be transformed/scaled (e.g., based on an attribute of the storage device such as its deduplication capabilities relative to that of the source storage device, based on a different time scale at which the data was recorded at the source storage device relative to the time scale at which data is stored at the destination storage device) prior to being added at the destination storage device.

At 606, it is determined if VM(s) have been removed from the storage device. In the event that VM(s) have been removed from the storage device, control is transferred to 608. Otherwise, in the event that no VM(s) have been removed from the storage device, process 600 ends. At 606, the storage device for which process 600 is performed is a source storage device for the removed VM(s). VM(s) may have been removed by a VM migration (e.g., that resulted from a user approval of a VM load balancing recommendation).

At 608, aggregated historical VM data associated with the storage device is modified based at least in part on historical data associated with the removed VM(s) stored at the storage device. Historical data (e.g., space usage, access rate, and/or load) associated with each removed VM that was stored at the storage device is excluded from the determination of aggregated effective historical VM data associated with the storage device. In some embodiments, the historical data of the removed VMs is discarded. In some embodiments, the historical data of the removed VMs is retained but indicated to not be included in the aggregated effective historical VM data.

Figure 7:
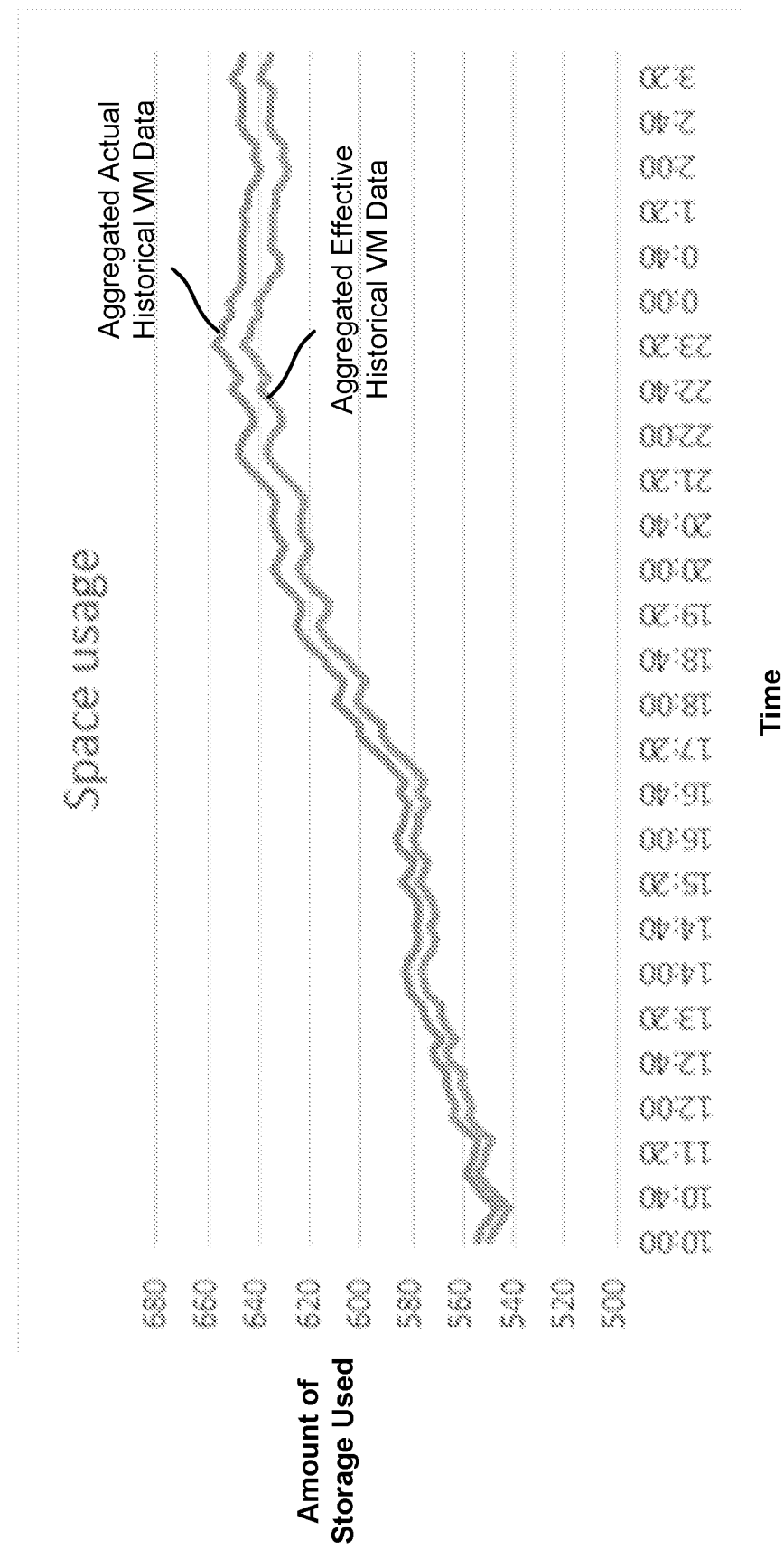
FIG. 7 is a diagram showing an example of comparing an aggregated actual historical VM data plot with an aggregated effective historical VM data plot at Storage Device A.

FIG. 7 is a diagram showing an example of comparing an aggregated actual historical VM data plot with an aggregated effective historical VM data plot at Storage Device A. The top plot shows the aggregated actual historical VM space usage data that is stored at Storage Device A across different points in time before accounting for the migration of one or more VMs off of Storage Device A. The bottom plot shows the aggregated effective historical VM space usage data that is stored at Storage Device A after accounting for the migration of one or more VMs off of Storage Device A. As such, the aggregated effective historical VM space usage data shows less space usage data at each time point because the space usage contributions of one or more VMs have been removed from each time point.

Some of these historical VM data must be approximated since the complete component-wise statistical breakdown may not be stored in some embodiments. In some embodiments, only the deltas against the source and destination storage devices are stored as storing deltas is more efficient than copying the data and applying the delta. Deltas may be easily removed or adjusted in the case that it is the cause of problems. Deltas are also easier to check against the actual historical VM data.

In some embodiments, when a new performance data point (e.g., of space usage) is generated (e.g., at a predetermined interval), the "effective history" table does not need to be altered.

Figure 8:
FIG. 8 is an example of a storage device specific predicted metric data structure.

FIG. 8 is an example of a storage device specific predicted metric data structure. In the example of FIG. 8, the data structure comprises vector 800 that stores 13 predicted metrics that were generated for a particular storage device using the storage device's aggregated effective historical VM data. In some embodiments, vector 800 is generated using a process such as process 500 of FIG. 5. The predicted metrics were stored in vector 800 at positions/elements that correspond to the respective priority associated with their metric type. For example, space usage related metric 1 is the metric type that is associated with the highest priority and is therefore the first element in vector 800. Load related metric 13 is the metric type that is associated with the lowest priority and is therefore the last element in vector 800. Predicted metrics corresponding to metric types of other priorities are inserted into vector 800 at corresponding positions/elements in between the first and the last elements, where the priority level of a metric type is denoted by a value from 0 to 12, where 0 indicates the highest priority and 12 indicates the lowest priority. In some embodiments, the combined predicted metrics use lexicographic (i.e., strict) ordering.

Table 3 below includes example metric types that are included in vector 800:

TABLE 3

| Priority (High to Low) | Metric Type | Metric Name | Brief Description |
|---|---|---|---|
| 0 | Space usage related Metric 1 | space_threshold_100 | Probability of a storage space running out of space (e.g., 100% storage space used). |
| 1 | Space usage related Metric 2 | space_threshold_snapshots | Probability of storage device ceasing to take snapshots (e.g., that 98% of storage space used). |
| 2 | Space usage related Metric 3 | space_threshold_replicas | Probability of storage device ceasing to accept replicas (e.g., that 95% of storage space used). |
| 3 | Protection policy violated Metric 4 | protection_policy_violated | Percentage of VMs whose protection policy cannot be maintained. |
| 4 | QoS related Metric 5 | qos_overcommit | Guaranteed QoS is overcommitted. |
| 5 | Access rate related Metric 6 | flash_overcommit_97 | Flash hit rate falls below 97% over the week. |
| 6 | Access rate related Metric 7 | flash_overcommit_99 | Flash hit rate falls below 99% over the week. |
| 7 | Load related Metric 8 | load_overcommit_80 | Percentage in next week that combined read/write load is above 80% of the storage device's capacity. |
| 8 | Load related Metric 9 | load_overcommit_60 | Percentage in next week that combined read/write load is above 60% of the storage device's capacity. |
| 9 | Space usage related Metric 10 | space_threshold_90 | Probability that the storage device goes over 90% full, triggering an alert. |
| 10 | Access rate related Metric 11 | flash_overcommit_999 | Flash hit rate falls below 99.9% over the week. |
| 11 | Space usage related Metric 12 | space_threshold_80 | Probability that the storage device goes over 80% full. |
| 12 | Load related Metric 13 | load_overcommit_40 | Percentage in next week that combined read/write load is above 40% of storage device capacity. |

The protection policy violated metric (Protection policy related Metric 4, above) is the percentage of VMs that will encounter a policy error when moved. The VM load balancing server should look at the replication policy attached to the VMs to be moved. If they are configured to replicate, and the destination storage device:

Does not have a replication license,

Does not have a replication link to the correct destination, or

Is the target of replication

Then that VM would be in a policy error state after migration. Other policy errors are possible, such as failure to apply the policy, for example.

This protection policy violated metric does not need to take existing policy errors into account. In some embodiments, it is not a "problem" metric that the VM load balancing server tries to improve. Instead, the VM load balancing server attempts to avoid making it worse.

In the example prioritization of metric types that is shown in Table 3, critical space problems (e.g., probability that either 100% or 98% or more of the storage space will be consumed) are prioritized highest. This is even more important than maintaining replication (e.g., which may take place unless 95% or more of the storage space will be consumed), in some embodiments. The other problems are all performance-related and must not break replication policies. A storage device that has lots of performance left but if cannot replicate it is not a good target for a VM that is being protected by replication. Flash misses also make big impacts on latency and so are issues to be addressed. I/O load also causes latency and is important to be addressed. The last few metric types will first ensure that no system hits the space threshold (if all of the above can also be satisfied), then work to optimize flash, then spread I/O load.

Figure 9:
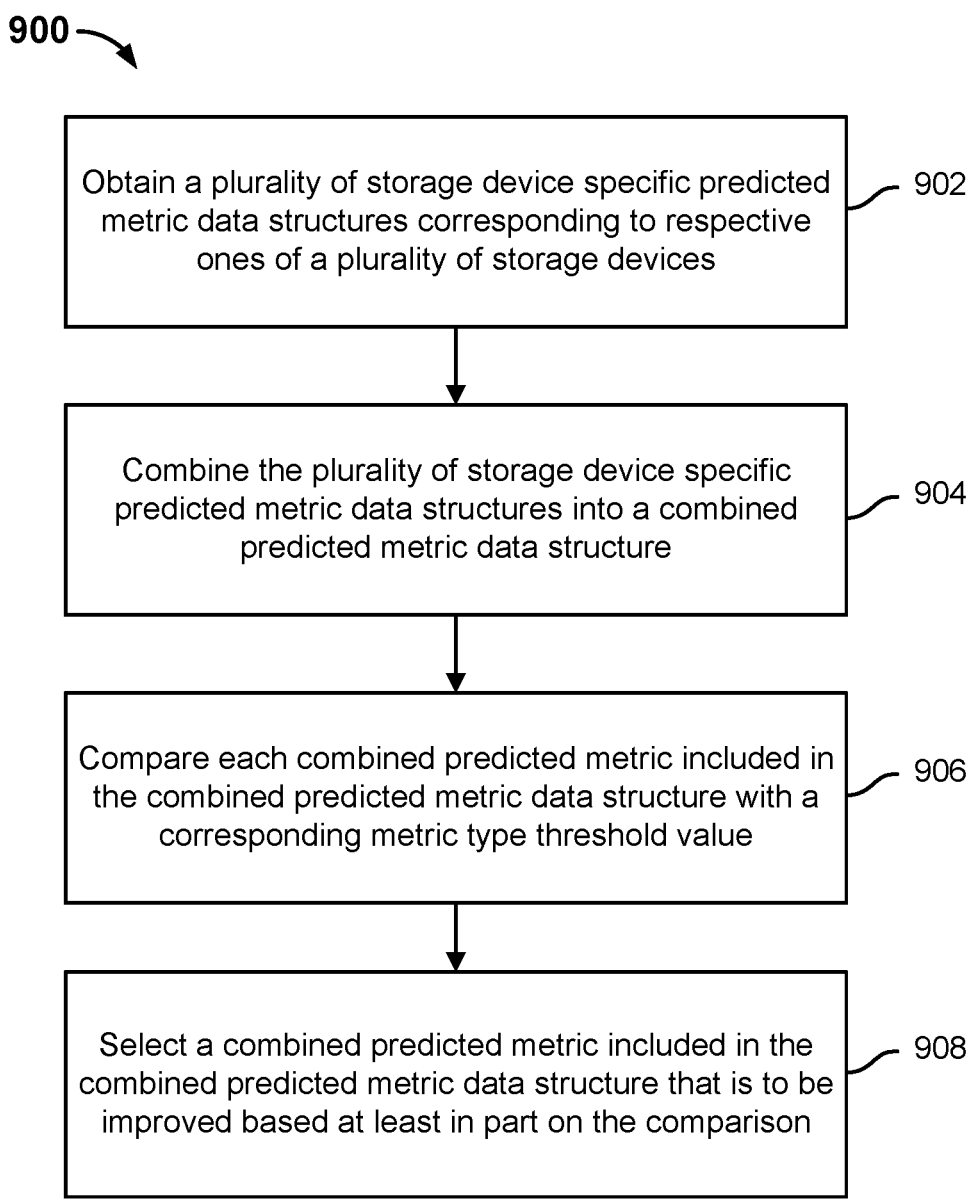
FIG. 9 is a flow diagram showing an embodiment of a process for determining a combined, pool-level predicted data structure.

FIG. 9 is a flow diagram showing an embodiment of a process for determining a combined, pool-level predicted data structure. In some embodiments, process 900 is implemented by VM load balancing server 112 of system 100 of FIG. 1. In some embodiments, steps 404 of process 400 of FIG. 4 may be implemented using process 900.

At 902, a plurality of storage device specific predicted metric data structures corresponding to respective ones of a plurality of storage devices is obtained. In some embodiments, a process such as 500 is implemented to obtain a storage device specific predicted metric data structure (e.g., vector 800 of FIG. 8) for each storage device that belongs to a pool of storage devices.

At 904, the plurality of storage device specific predicted metric data structures is combined into a combined predicted metric data structure. The combined predicted metric across the predicted metrics associated with the same metric type from each storage device specific data structure is the probability that the pool, as a whole, will encounter the undesirable event (e.g., reaching 100% of space usage) associated with the metric type. In various embodiments, the storage device specific predicted metric data structures are combined to form a combined, pool-level predicted metric data structure by determining a joint probability across the predicted metrics associated with the same metric type from each storage device specific data structure.

For example, there are n storage devices in a pool, P1 is the predicted metric (probability) that Storage Device 1's space usage is going to reach 100% storage capacity, P2 is the predicted metric (probability) that Storage Device 2's space usage is going to reach 100% storage capacity, . . . and Pn is the predicted metric (probability) that Storage Device n's space usage is going to reach 100% storage capacity. As such, (1−P1) is the probability that Storage Device 1's space usage is not going to reach 100% storage capacity, (1−P2) is the probability that Storage Device 2's space usage is not going to reach 100% storage capacity, . . . and (1−Pn) is the probability that Storage Device n's space usage is not going to reach 100% storage capacity. Therefore, the joint probability that at least one storage device in the pool's space usage is going to reach 100% storage capacity is:

$$1-(1-P1)(1-P2)\ldots(1-Pn) \quad (1)$$

Formula (1) indicates that a change in even one of the predicted metrics (e.g., if the predicted metric (probability) that a storage device's will reach 100% storage capacity lowers) will improve the combined, pool-level predicted metric.

In the event that a predicted metric comprises a range of probabilities (instead of a single probability value), the joint probability for predicted metrics of storage devices of a pool may be computed as follows: compute a first joint probability of all the upper limits of the predicted metrics and a separate, second joint probability of all the lower limits of the predicted metrics and use the first and second joint probabilities as the endpoints of the combined predicted metric.

In some embodiments, bounding the storage device specific predicted metrics probabilities below 0.99 ensures that the combined, pool-level probability does not saturate at 1.0. For example, in a 10 storage device pool with five storage devices at a threshold and five below the threshold, the calculated value would be:

$$1-(1-0.99)^5(1-0.01)^5=0.99999999990490099501$$

So if a change increases the probability on one of the storage devices to 0.02, there is a detectable difference:

$$1-(1-0.99)^5(1-0.01)^4(1-0.02)=0.99999999990586159102$$

That is, even with some storage devices above the threshold, causing others to breach it is still worse.

In some embodiments, each combined predicted metric is stored in the format of 1−ε format, where ε is (1−P1)(1−P2) . . . (1−Pn) to maintain more precision in the combined predicted metric.

At 906, each combined predicted metric included in the combined predicted metric data structure is compared with a corresponding metric type threshold value.

In various embodiments, each combined predicted metric is compared to a predetermined threshold value corresponding to its metric type. For example, the combined predicted metric for reaching 100% of storage capacity at one or more VMs is compared against the predetermined threshold value for reaching 100% of storage capacity.

An example predetermined threshold value for any of the combined predicted space usage related metric types is 0% because no chance of running out of space is acceptable.

An example predetermined threshold value for any of the combined predicted load related metric types is 1% because some heavy load may be acceptable (e.g., a few hours per week).

A predetermined threshold value may be selected for each of the combined predicted access rate related metric types. For example, the combined 97% flash hit rate metric has a corresponding predetermined threshold of 3% misses, the combined 99% flash hit rate metric has a corresponding predetermined threshold of 1% misses, and the combined 99.9% flash hit rate metric has a corresponding predetermined threshold of 0.1% misses.

The values of predetermined thresholds could be made higher to reduce the number of recommendations, in case they are too noisy or are perceived as only solving lower-probability events.

At 908, a combined predicted metric included in the combined predicted metric data structure that is to be improved based at least in part on the comparison is selected.

A combined, pool-level predicted metric that exceeds a corresponding predetermined threshold value is determined to be a "problem" metric and one that the VM load balancing server will attempt to improve via recommending one or more VMs to be migrated among storage devices within the pool, as will be described in further detail below.

Figure 10:
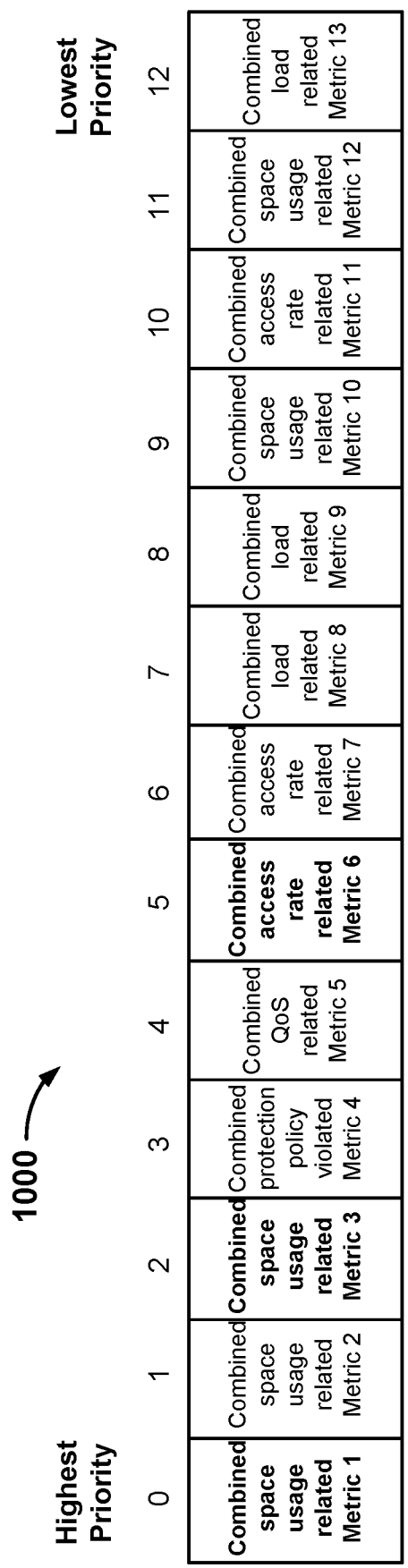
FIG. 10 is a diagram showing a combined predicted metric data structure.

FIG. 10 is a diagram showing a combined predicted metric data structure. In the example of FIG. 10, the combined predicted metric data structure is combined predicted metric vector 1000. Each combined predicted metric of combined predicted metric vector 1000 that is selected to be improved (e.g., having a combined predicted metric that is greater than a corresponding threshold value) is shown in bolded text. As such, in the example of FIG. 10, the combined space usage related metric 1, combined space usage related metric 3, and combined access rate related metric 6 are each determined to be improved and therefore, selected to be used to determine and recommend which VMs to migrate among storage devices of the pool. An example processing for improving a combined, pool-level predicted data structure is described in FIG. 11, below. In some embodiments, in the event that there are multiple selected combined predicted metrics to be improved, then VMs are selected to be migrated among a pool of storage devices for each selected combined predicted metric, starting with the one corresponding to the metric type of the highest priority and proceeding to each other of the selected combined predicted metrics in the order of their descending priorities.

Figure 11:
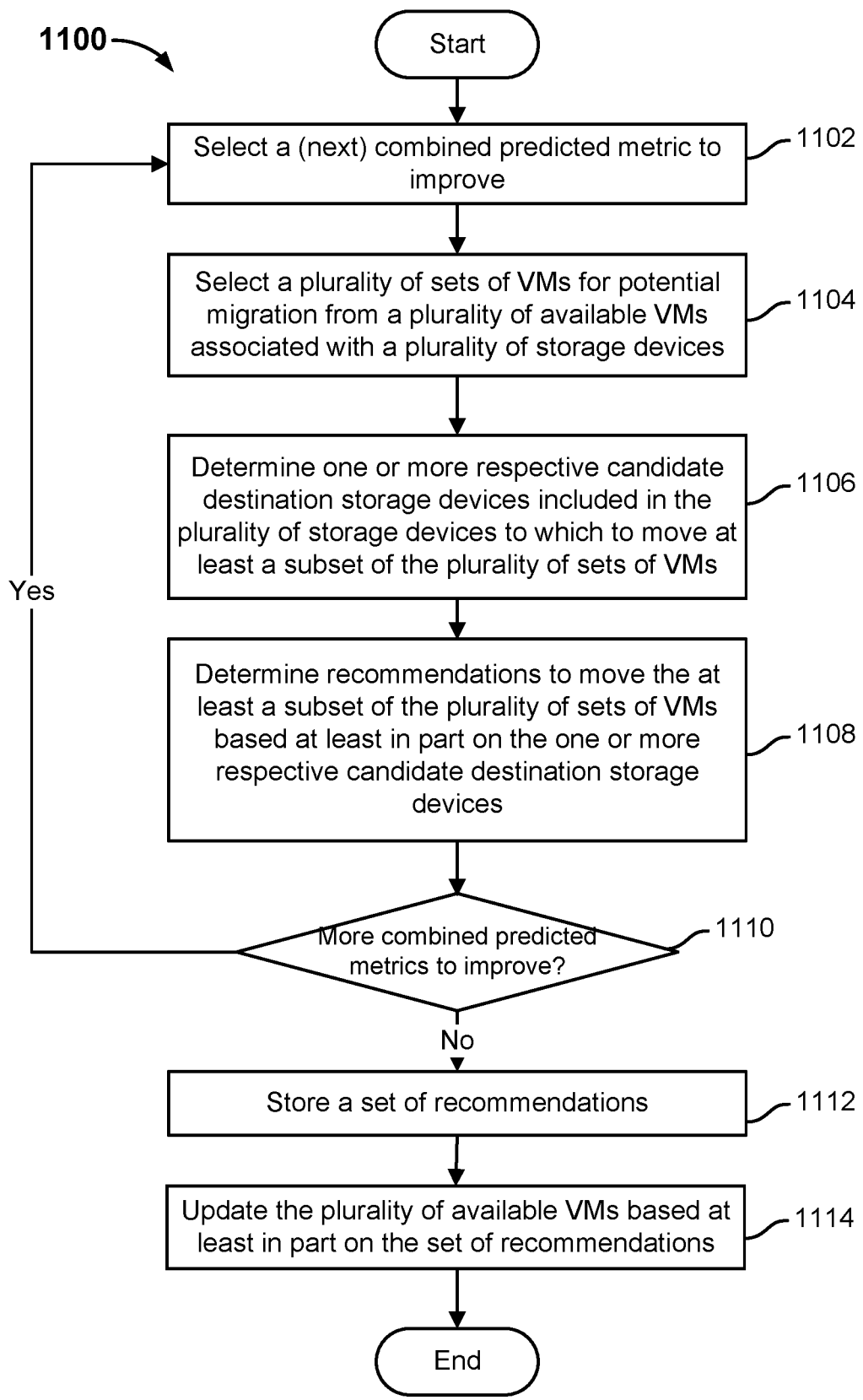
FIG. 11 is a flow diagram showing an embodiment of a process for generating a set of recommendations associated with sets of VMs to migrate within a plurality of VMs.

FIG. 11 is a flow diagram showing an embodiment of a process for generating a set of recommendations associated with sets of VMs to migrate within a plurality of VMs. In some embodiments, process 1100 is implemented by VM load balancing server 112 of system 100 of FIG. 1.

At 1102, a (next) combined predicted metric to improve is selected. A combined predicted metric to improve for the plurality (pool) of storage devices is selected. As mentioned above, a combined predicted metric may be selected to improve if the combined predicted metric is a value that is greater than a predetermined threshold value corresponding to the metric type associated with that combined predicted metric. Additionally, as mentioned above, a combined predicted metric may be selected to improve because the current value of the combined predicted metric indicates that the pool of storage devices is predicted to be collectively at a higher risk of suffering an undesirable event in the future (e.g., by exceeding a predetermined threshold value associated with the corresponding metric type).

At 1104, a plurality of sets of VMs for potential migration is selected from a plurality of available VMs associated with a plurality of storage devices. In various embodiments, available VMs associated with the pool of storage devices refer to VMs that currently reside on any storage device in the pool that are permitted to move/migrate from their respective source storage devices to another storage device within the pool. In some embodiments, available VMs are determined by filtering out, from a set of all VMs in the pool, VMs based on user configured or otherwise generated affinity rules, VMs based on their inclusion in another set of recommendations, and/or VMs based on other predetermined VM attributes. For example, an affinity rule may require a VM to remain at (e.g., temporarily) (not be moved from) its source storage device. VMs that are already included in a previously generated set of recommendations may be excluded in order to generate non-overlapping options. Examples of VM attributes that cause them to be unavailable for/excluded from potential migration are VMs that have a high-frequency snapshot schedule, VMs that have disks on multiple storage devices, VMs whose hypervisor does not support live migration (or replication), and VMs on a datastore (i.e., "submount") with no corresponding datastore elsewhere within the pool. In some embodiments, a "datastore" is a particular volume or partition on a storage device. For example, the storage device could be mounted multiple times, once at Path A, once at Path B, once at Path C, for different sets of VMs or even different hypervisors. The VMs that are remaining after the filtering out process form the available VMs from which sets of VMs are to be selected.

Figure 12:
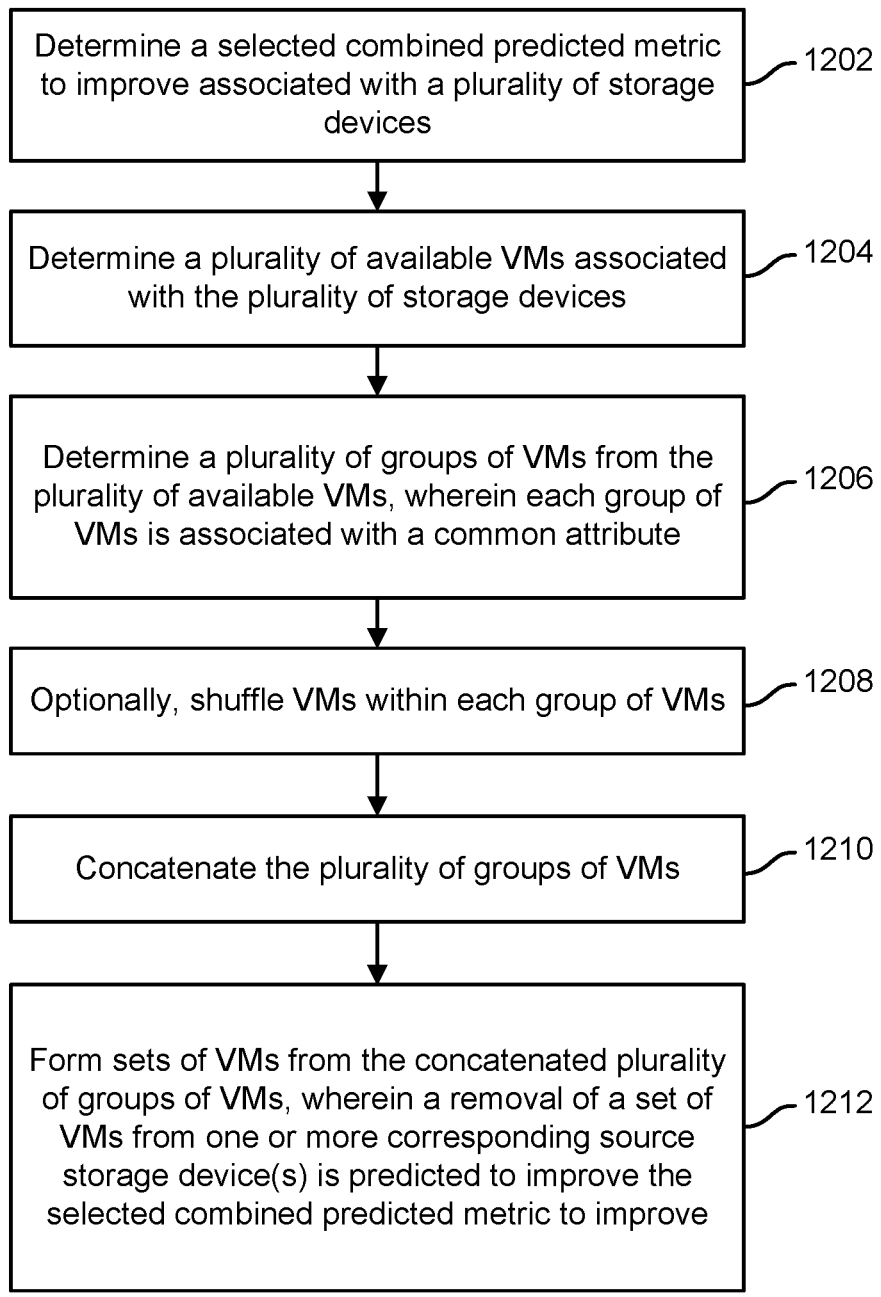
FIG. 12 is a flow diagram showing an example of a process for determining an ordering of available VMs and forming sets of VMs from the ordered available VMs.
Figure 13:
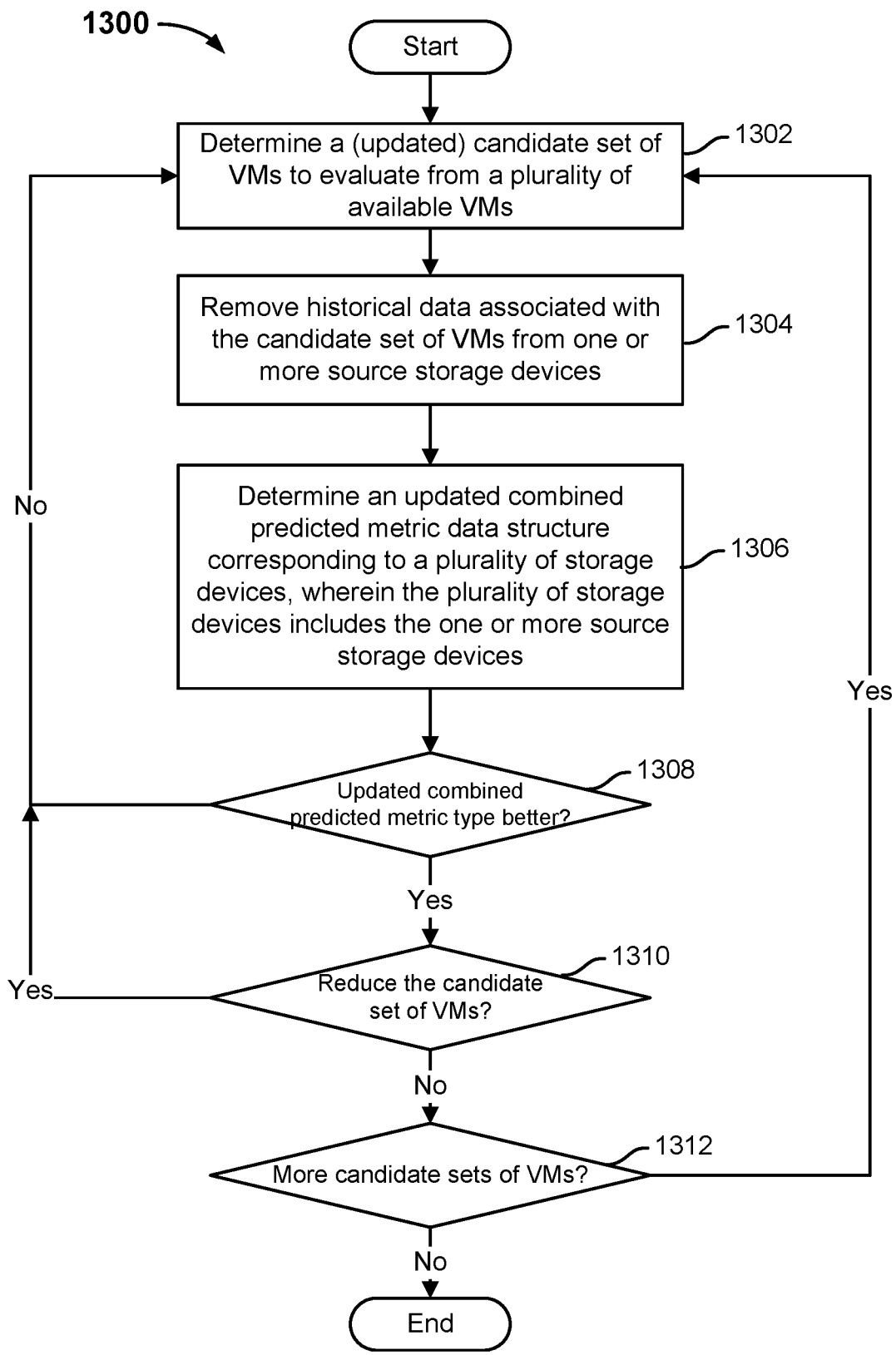
FIG. 13 is a flow diagram showing an example of a process for forming sets of VMs.
Figure 14:
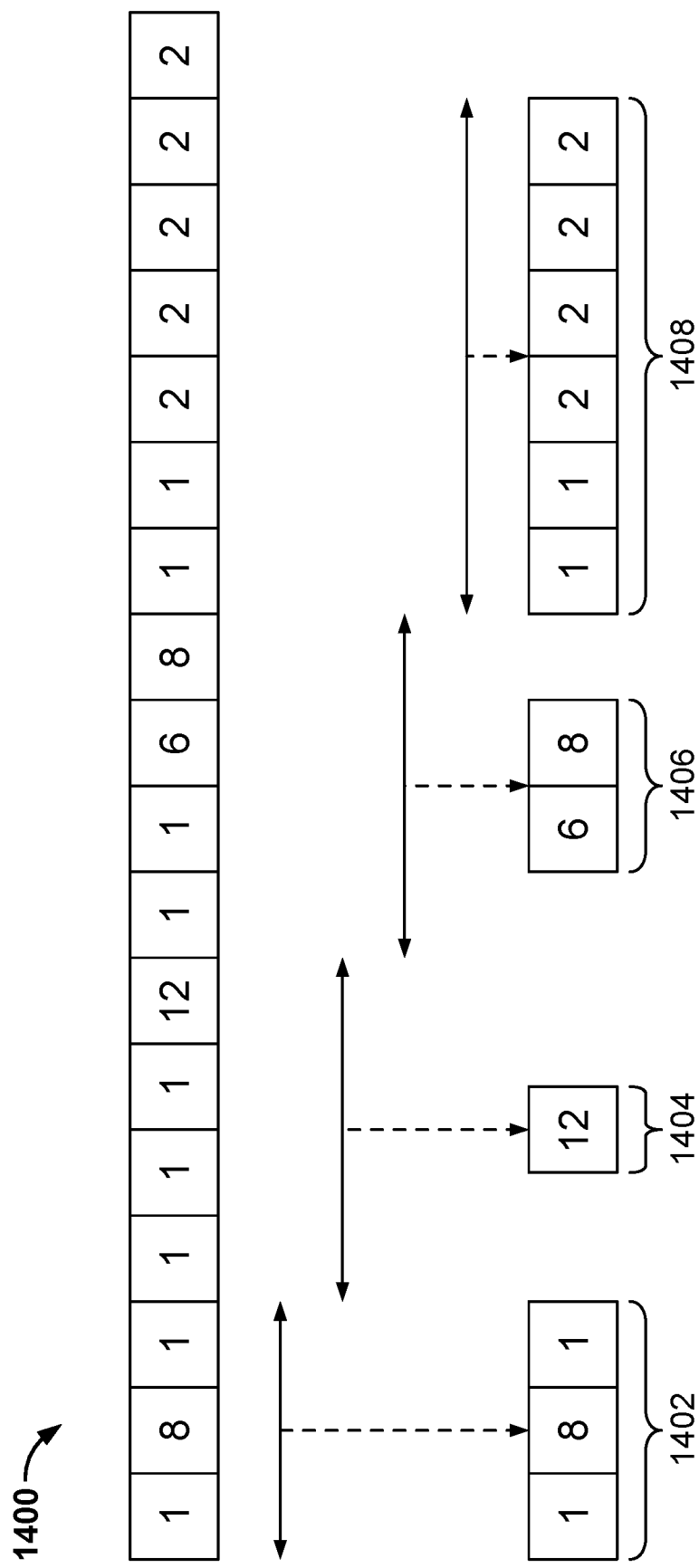
FIG. 14 shows examples of statistically significant candidate sets of VMs that are selected from an ordered array of available VMs.

Then, from among the available VMs, sets of VMs to migrate to potentially migrate to a new destination storage device within the pool are determined. In various embodiments, sets of VMs are formed/selected such that the collective effect across the VMs in the set is statistically significant. FIGS. 12, 13, and 14, below, describe example techniques of selecting sets of VMs.

At 1106, one or more respective candidate destination storage devices included in the plurality of storage devices to which to move at least a subset of the plurality of sets of VMs are determined. The storage devices within the pool that each set of VMs is permitted/allowed to move to are determined. In some embodiments, which storage device that a VM is allowed to move to is determined based at least in part on a stored affinity rule associated with the VM. For example, an affinity rule may prohibit VM-123 from moving to Storage Device B but allow VM-123 to move to Storage Device C. In some embodiments, a set of VMs is to be moved to the same destination storage device so candidate destination storage devices are ones that each VM in the set is allowed to individually move to; that is, the intersection of the allowed destinations for all VMs in the set is the candidate destination storage devices.

Figure 15:
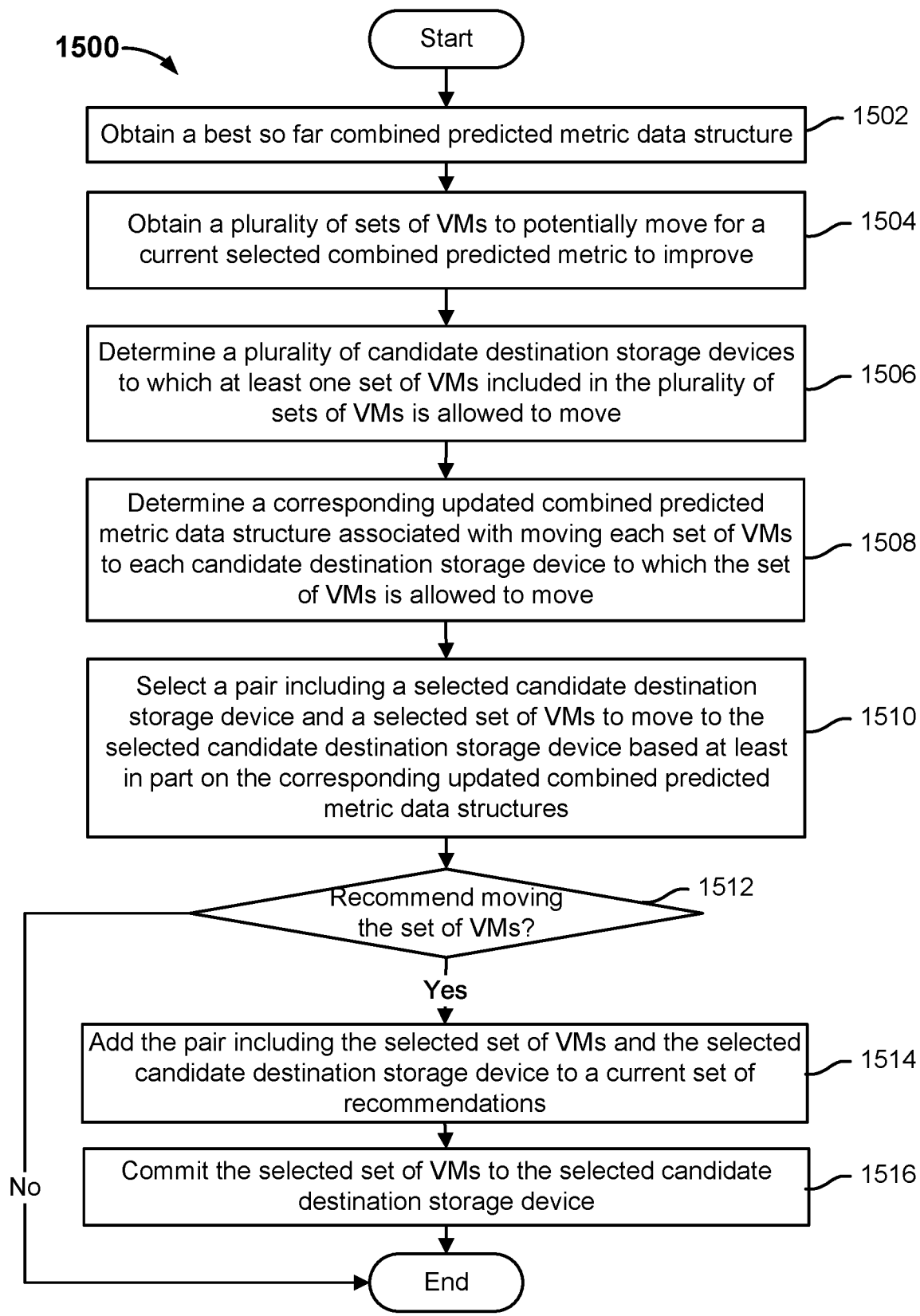
FIG. 15 is a flow diagram showing an example of a process for determining new destination storage devices to which to migrate formed sets of VMs.

At 1108, recommendations to move the at least a subset of the plurality of sets of VMs are determined based at least in part on the one or more respective candidate destination storage devices. A recommendation proposes to move a set of VMs from their respective source storage device(s) to a new destination storage device that is selected among the corresponding set of candidate destination storage devices. In various embodiments, a set of VMs is recommended to move to a destination storage device because it is predicted that after the set of VMs is moved to the new destination storage device, thereby freeing up resources at their respective source storage devices and consuming resources at the new destination storage device, the recomputed combined predicted metric that is selected to improve at step 1102 is improved over its previous value. Put another way, the combined predicted metric was selected to be improved because it represented a higher probability of risk of an undesirable event occurring with respect to the pool of storage devices and a recommendation to move a set of VMs to a new destination storage device is generated because the updated combined predicted metric, computed after the hypothetical move takes place, represents a lower probability of risk of the undesirable event occurring. In the event that there is more than one candidate destination storage device that is predicted to improve the combined predicted metric, a cost function is associated with the migration of the set of VMs to each of the tied candidate destination storage devices to break the tie. FIG. 15, below, describes an example of selecting a candidate destination storage device to which to recommend to move a set of VMs.

As will be described in further detail below, after a recommendation to move a set of VMs to a selected candidate destination storage device has been determined, in determining each subsequent recommendation involving migrating another set of VMs to a new destination storage device, it is assumed that the VMs of the former set of VMs have already been committed and also migrated to its selected candidate destination storage device.

Multiple recommendations may be generated to improve the selected combined predicted metric to improve for the pool, where each recommendation recommends the migration of a different set of VMs.

At 1110, it is determined whether there is at least one more combined predicted metric to improve. In the event that there is at least one more combined predicted metric to improve, control is returned to 1102. Otherwise, in the event that there are no more combined predicted metrics to improve, control is transferred to 111$s$. If the highest-priority combined predicted metric for a pool has been solved/improved, recommendations to move sets of VMs to new destination storage devices are generated to improve a next highest priority combined predicted metric that is selected to be improved. In returning to step 1102, it is assumed that any VMs already included in a previous recommendation have already been moved to their respectively selected candidate storage devices.

At 1112, a set of recommendations is stored. The set of recommendations that was generated to improve one or more combined predicted metrics that are selected to be improved is stored. In various embodiments, the set of recommendations is also presented to a user at a user interface. The user at the user interface may select to implement all the recommendations of the set.

At 1114, the plurality of available VMs is updated based at least in part on the set of recommendations. Any VMs that are included in the set of recommendations are removed from the set of available VMs. By removing the VMs that are included in the set of recommendations from the set of available VMs, if process 1100 were to be repeatedly implemented to determine orthogonal, alternative recommendation sets (as will be described with FIG. 16, below), each subsequently generated set of recommendations is guaranteed to not include any VMs that are common to a previously generated set of recommendations.

FIG. 12 is a flow diagram showing an example of a process for determining an ordering of available VMs and forming sets of VMs from the ordered available VMs. In some embodiments, process 1200 is implemented by VM load balancing server 112 of system 100 of FIG. 1. In some embodiments, step 1104 of process 1100 of FIG. 11 may be implemented using process 1200.

Process 1200 is an example process that may be implemented to determine an order/sequence of available VMs at a pool of storage devices. As each successively lower priority combined predicted metric to improve is selected for improvement, process 1200 may be repeated for each such combined predicted metric to improve.

At 1202, a selected combined predicted metric to improve associated with a plurality of storage devices is determined. As mentioned above, a combined predicted metric may be selected to improve because the current value of the combined predicted metric indicates that the pool of storage devices is predicted to be collectively at a higher risk of suffering an undesirable event in the future (e.g., by exceeding a predetermined threshold value associated with the corresponding metric type).

At 1204, a plurality of available VMs associated with the plurality of storage devices is determined. As mentioned above, available VMs associated with the pool of storage devices refers to VMs that currently reside on any storage device in the pool that are permitted to move/migrate from their respective source storage devices to another storage device within the pool. In some embodiments, available VMs are determined by filtering out, from a set of all VMs in the pool, VMs based on user configured or otherwise generated affinity rules, VMs based on their inclusion in another set of recommendations, and/or VMs based on other predetermined VM attributes.

At 1206, a plurality of groups of VMs is determined from the plurality of available VMs, wherein each group of VMs is associated with a common attribute. In some embodiments, VMs of the set of all available VMs that share a common attribute are included in the same group. In some embodiments, a VM may only be included in one group of VMs. In various embodiments, a group of VMs includes VMs whose affinity rules are the same (e.g., the VMs of a group have affinity rules such that they are all allowed to be moved to at least one of the same destination storage devices). That is, it is best if a group of VMs does not have VMs with two different anti-affinity rules, making the set choice constrained to be the intersection of the choices.

The following is one example technique to determine groups of VMs:

Build a multimap keyed by a datastore and anti-affinity rule, and insert the not excluded VMs into that map. Then, generate an array of VMs in the following manner:

Randomly select a datastore;

Iterate over each anti-affinity rule associated with VMs in that datastore, in random order; and Shuffle (i.e., randomly place) the VMs with a matching datastore and rule on to the end of the current array.

At 1208, optionally, VMs within each group of VMs are shuffled (e.g., randomly placed within the group).

At 1210, the plurality of groups of VMs is concatenated. The groups of VMs are then concatenated based on any appropriate technique. In some embodiments, a less constrained group of VMs (e.g., a group of VMs with fewer restrictions on destination storage devices that they can migrate to) is sandwiched between more constrained groups of VMs (e.g., groups of VMs with more restrictions on destination storage devices that they can migrate to). In some embodiments, the concatenated groups of VMs are stored in an array or other data structure to preserve the ordering of the available VMs. For example, if VMs with affinity rule "A" and VMs with affinity rule "B" coexist with VMs with no affinity rule "N," then AAAAAANNNNNBBBBB leads to better candidate sets of VMs than AAAAAAABBBBBBNNNN. With a third rule "C," the ordering of AAANNNBBBNNNCCC may be desired. The ordering AAAAAABBBBBB could result in picking a set that has both A's and B's, with the result that that set is constrained by both rules. The ordering AAAAAANNNNNBBBBB makes it more likely that sets include A's and N's, or N's and B's, which are only as constrained as the rules A or B (rather than both rules A and B). It is desirable to generate sets that have as few "extra" constraints as possible. (On the other hand, a group consisting of just A's or just B's or just N's may not be big enough.)

At 1212, sets of VMs from the concatenated plurality of groups of VMs are formed, wherein a removal of a set of VMs from one or more corresponding source storage device(s) is predicted to improve the selected combined predicted metric to improve. In some embodiments, the array of concatenated groups of VMs is iterated through to find sets of VMs that are adjacent in the array and that are collectively of a statistically significant size such that the hypothetical removal of such a set of VMs from their respective source storage device(s) would cause the combined predicted metric to improve to be recomputed with a better value (e.g., a value that represents a lower risk/probability of an undesirable event occurring in the future with respect to the pool of storage devices). Put another way, each set of adjacent VMs in the array is formed such that, in a hypothetical scenario in which the set of VMs are removed from their respective source storage device(s), the updated combined predicted metric to improve, recomputed based on the hypothetical scenario in which the VMs of the set are no longer using resources at the source storage devices, is determined to be better than its current value. FIG. 13, below, describes an example process of forming sets of VMs.

FIG. 13 is a flow diagram showing an example of a process for forming sets of VMs. In some embodiments, process 1300 is implemented by VM load balancing server 112 of system 100 of FIG. 1. In some embodiments, step 1212 of process 1200 of FIG. 12 may be implemented, at least in part, using process 1300.

Process 1300 is an example process that may be implemented to form sets of VMs that are potentially recommended to be migrated to alleviate a current combined predicted metric for a pool of storage devices. As each successively lower priority combined predicted metric to improve is selected for improvement, process 1300 may be repeated for each such combined predicted metric to improve.

At 1302, a (updated) candidate set of VMs to evaluate is determined from a plurality of available VMs. Candidate sets of VMs are evaluated from all the available VMs in the pool of storage devices to search for sets of VMs that are statistically significant in aggregate size such that their removal from their source storage devices would cause a selected combined predicted metric to improve to be an improved value after an updated computation. In some embodiments, a candidate set of VMs is searched among available VMs organized in an array, such as an array of available VMs that is formed by process 1200 of FIG. 12. In some embodiments, given a maximum number of VMs, a portion (e.g., half) of that maximum number of VMs is found among the array of VMs used as a candidate set of VMs. As will be described by steps 1304 and 1306, below, the candidate set of VMs is then evaluated to determine whether their removal from their source storage devices would cause an improvement to the selected combined predicted metric to improve.

At 1304, historical data associated with the candidate set of VMs is removed from one or more source storage devices. The removal of the VMs of the candidate set from their source storage device(s) is simulated by removing the historical data (e.g., space usage, access rate data, load data) associated with the VMs from the source storage device(s). The removal of the historical data associated with the VMs from the source storage device(s) simulates the effect of the VMs of the candidate set no longer utilizing resources at the source storage device(s). In various embodiments, the simulated removal of the historical data associated with the VMs from the source storage device(s) does not actually entail deleting the historical data associated with the VMs from the source storage device(s) but rather ignoring such historical data for the purpose of generating predicted metrics at the source storage devices using a process such as process 500 of FIG. 5.

At 1306, an updated combined predicted metric data structure corresponding to a plurality of storage devices is determined, wherein the plurality of storage devices includes the one or more source storage devices. A storage device specific predicted metric data structure is once again computed for each storage device in the pool and combined, using a process such as process 900 of FIG. 9, to determine an updated combined predicted metric data structure associated with the pool. Due to the removal of the historical data associated with the VMs from the source storage device(s), fewer VMs are using resources at the source storage device(s) levels and therefore, the combined predicted metrics at the pool level should also improve (e.g., result in values that represent lower probabilities of an undesirable event occurring).

At 1308, it is determined whether the updated combined predicted metric type is better than an original combined predicted metric. In the event that the updated combined predicted metric type is better than the original combined predicted metric, it is determined that the candidate set of VMs is determined to be statistically significant and control is transferred to 1310, at which it is determined whether the candidate set of VMs is to be reduced. Otherwise, in the event that the updated combined predicted metric type is not better than the original combined predicted metric, it is determined that the candidate set of VMs is not statistically significant and control is returned to 1302, where an updated candidate set of VMs is evaluated.

Because process 1300 is invoked in generating recommendations for a particular selected (e.g., the current highest priority) combined predicted metric to improve, it is determined if the updated selected combined predicted metric to improve in the simulated scenario of having removed the candidate set of VMs from their source storage device(s) is better (e.g., the updated value represents a lower probability of an undesirable event occurring) than the original value, prior to the simulation. If the selected combined predicted metric to improve has been improved in the simulation, then the candidate set of VMs is determined to be statistically significant but may be reduced in size, as will be described at step 1310. Otherwise, if the candidate set of VMs is determined to not cause an improvement to the selected combined predicted metric to improve, then upon returning to step 1302, the candidate set of VMs is updated by adding at least one VM (e.g., the next VM in the array) and the expanded candidate set of VMs is again evaluated at steps 1304, 1306, and 1308 for whether their removal from their source storage devices would cause an improvement to the selected combined predicted metric to improve.

At 1310, it is determined whether the candidate set of VMs is to be reduced. In the event that the candidate set of VMs is to be reduced, the control is transferred to 1302, at which the candidate set of VMs is reduced by at least one VM. Otherwise, in the event that the candidate set of VMs is not to be reduced, it is determined that the candidate set of VMs is statistically significant enough and control is transferred to 1312.

In some embodiments, if the candidate set of VMs is determined to cause an improvement to the selected combined predicted metric to improve at step 1308, then control is transferred to step 1310, at which it is determined whether to trim the candidate set of VMs. If the candidate set of VMs is reduced (e.g., by removing at least the first VM of the group) at step 1310, the reduced candidate set of VMs is again evaluated at steps 1304, 1306, and 1308 for whether their removal from their source storage devices would cause an improvement to the selected combined predicted metric to improve. The trimming and/or expansion of a candidate set of VMs is repeated at steps 1310 and 1302, respectively, until a statistically significant candidate set of VMs is found at step 1308. For example, a statistically significant (e.g., "just large enough") candidate set of VMs is a candidate set of VMs for which one fewer VM would cause the set to be not statistically significant. In various embodiments, a statistically significant candidate set of VMs is simply referred to as a "set of VMs" that is formed. The "just large enough" candidate set of VMs is determined to be a formed set of VMs for which a migration destination is to be determined. For example, if the maximum number of VMs that can be included in a set of VMs to migrate is set at 50 VMs, then the first 25 VMs from one end of the array of ordered available VMs may be first considered as a candidate set of VMs. The candidate set of 25 VMs is then evaluated for whether it is statistically significant based on steps 1304, 1306, and 1308. If the candidate set of 25 VMs is determined to be statistically significant at step 1308, control is transferred to step 1310, at which it is determined whether to reduce the candidate set of VMs. In the event that it is determined that if the candidate set of VMs was to include one fewer VM (e.g., from the beginning of the candidate set of VMs), 24 VMs, it would become no longer statistically significant, then the candidate set of VMs is maintained at 25 VMs. Otherwise, in the event that it has been determined that if the candidate set of VMs were to include one fewer VM, 24 VMs, and the candidate set is still statistically significant, the candidate set of VMs is further reduced by one VM (e.g., from the beginning of the candidate set of VMs) to include just 23 VMs. After a statistically significant (e.g., just big enough) candidate set of VMs is determined, the next candidate set of initially 25 VMs may be taken from the first VM of the array that follows the last VM that was included in the immediately previously determined statistically significant candidate set of VMs.

The following is another example technique, involving binary search, of determining statistically significant candidate sets of VMs:

1. Initialize start=0, end=array size-1
2. Perform binary search on [start, end] to identify the smallest prefix [start,setEnd] of the array which has a statistically-significant reduction in the selected combined predicted metric to improve.
3. If no such prefix exists, end VM set formation
4. Perform binary search on [start, setEnd] to remove any unnecessary VMs from the start of the set. That is, find the largest setStart such that [setStart, setEnd] is still statistically significant
5. Output the set [setStart, setEnd]
6. Update start=setEnd+1 and return to step 2

The calculation of statistically significance can be estimated using interval arithmetic rather than a statistical test, where each pair of numbers is a confidence interval on the underlying probability:

If one metric is [a,b] and the other is [c,d], then [a,b]<[c,d] if b<c

If one metric is [0,0] and the other contains nonzero elements, then [0,0]<[a,b], including [0,0]<[0,b]

FIG. 14 shows examples of statistically significant candidate sets of VMs that are selected from an ordered array of available VMs. In the example of process 1400, assume that the maximum number of VMs to be included in a set of VMs is 10. Each box shown in FIG. 14 represents a VM and the number within each box represents the size of significance with the size of 10 set as the example threshold for significance. Four sets of statistically significant candidate sets of VMs, set 1402, 1404, 1406, and 1408, are determined from the array of ordered, available VMs in a pool of storage devices. Set 1402 started as a candidate set of three VMs and it was determined that the candidate set of three VMs was statistically significant and that no trimming was necessary. Set 1406 started as a candidate set of four VMs and was trimmed to include only a single VM, which is statistically significant on its own. Set 1406 started as a candidate set of four VMs and it was trimmed down to a set of two VMs. Set 1408 started as a candidate set of six VMs and it was determined that the candidate set of six VMs was statistically significant and that no trimming was necessary.

At 1312, it is determined if there is at least one more candidate set of VMs to evaluate. In the event that there is at least one more candidate set of VMs to evaluate, control is returned to 1302. Otherwise, in the event that there are no more candidate set of VMs to evaluate, process 1300 ends. In various embodiments, if each VM in the entire array of ordered, available VMs have been evaluated as part of a candidate set of VMs even if it was not included in a formed set of VMs, then there are no more candidate sets of VMs to evaluate.

In some embodiments, the total number of sets of VMs generated by a single storage device is limited to a configured value (e.g., 50 sets).

FIG. 15 is a flow diagram showing an example of a process for determining new destination storage devices to which to migrate formed sets of VMs. In some embodiments, process 1500 is implemented by VM load balancing server 112 of system 100 of FIG. 1. In some embodiments, step 1312 of process 1300 of FIG. 13 may be implemented, at least in part, using process 1500.

Process 1500 describes an example process of selecting a candidate destination storage device to which to move a selected set of VMs, to improve a current, selected combined predicted metric associated with a pool of storage devices. As will be described below, pairs of sets of VMs and candidate destination storage devices are looped over at the same time, and the pair of the set of VMs and the corresponding candidate destination storage device that is associated with the best updated combined predicted metric data structure is selected. As each successively lower priority combined predicted metric to improve is selected for improvement, process 1500 may be repeated for each such combined predicted metric to improve.

At 1502, a best so far combined predicted metric data structure is obtained. In various embodiments, the "best so far" combined predicted metric data structure comprises the predicted metric data structure that was combined for the plurality (pool) of storage devices after one or more migrations of sets of VMs to new destination storage devices have been simulated/hypothetically occurred for one or more previously selected combined predicted metrics to improve (selected combined predicted metrics that are associated with higher priorities). For example, the best so far combined predicted metric data structure may initially be set to the original combined predicted metric data structure that represents the actual current combined predicted metrics of the pool (e.g., the combined predicted metric data structure that was determined by a process such as process 900 of FIG. 9.) As recommendations for migrations of sets of VMs to new destination storage devices are made using repeated iterations of process 1500 for various combined predicted metrics to improve, the best so far combined predicted metric data structure is updated to reflect the most improved combined predicted metric data structure so far based on the series of VMs migrations that have been recommended so far.

It is not desirable to make a higher-priority combined predicted metric worse in the course of solving a lower-priority combined predicted metric. And, if it is possible to find a solution to a higher-priority combined predicted metric in the course of examining potential moves for lower-priority combined predicted metrics, that move will be favored over others which only improve lower-priority combined predicted metrics. Put another way, sets of VMs that are formed for lower-priority combined predicted metrics may not be recommended to move at all if such moves could worsen a high priority combined predicted metric. Specifically, as will be described below, the best so far combined predicted metric data structure is used to determine whether the combined predicted metric data structure can be improved any further by a migration of a set of VMs that is formed for the current, selected combined predicted metric. If the current best so far combined predicted metric data structure cannot be improved upon, then process 1500 ends for the current, selected combined predicted metric and in some embodiments, the next highest priority selected combined predicted metric to improve is evaluated and used to form sets of VMs using a process such as process 1300 of FIG. 13.

At 1504, a plurality of sets of VMs to potentially move is obtained. In some embodiments, each set of VMs may be determined for the current selected combined predicted metric by a technique such as process 1300 of FIG. 13.

For example, sets of VMs Set A, Set B, and Set C are generated.

At 1506, a plurality of candidate destination storage devices to which at least one set of VMs included in the plurality of sets of VMs is allowed to move is determined. In various embodiments, a candidate destination storage device comprises a storage device within the pool of storage devices to which all VMs of at least one set of VMs is permitted to (e.g., based on stored affinity rules) move. In some embodiments, all of the VMs in a set are to be moved to the same destination storage device.

Returning to the example above, destination candidate storage devices included in the pool of storage devices D1, D2, and D3 are determined because at least one of sets of VMs Set A, Set B, and Set C is permitted to move to each of D1, D2, and D3.

At 1508, a corresponding updated combined predicted metric data structure associated with moving each set of VMs to each candidate destination storage device to which the set of VMs is allowed to move is determined. For each combination or pair of a set of VMs and a candidate destination storage device, a hypothetical (what-if) scenario is generated in which that particular set of VMs is removed from its corresponding source storage devices (e.g., the VMs of the candidate sets may reside on the same or different source storage devices) and then migrated to that particular candidate destination storage device. In each hypothetical (what-if) scenario, the historical data of each VM of that set is removed from its corresponding source storage devices and then added to that particular candidate destination storage device. In each hypothetical (what-if) scenario, an updated combined, pool-level predicted metric data structure is computed for that pair of a set of VMs and a candidate destination storage device based on the hypothetical migration of the set of VMs. Computing the updated combined, pool-level predicted metric data structure may be determined using a process such as process 900 of FIG. 9.

Returning to the example above, an updated combined, pool-level predicted metric data structure may be determined for each of the following eight pairs of a set of VMs and a candidate destination storage device (that the set of VMs is permitted to move to):

Set A moves to D1
Set A moves to D2
Set A moves to D3
Set B moves to D1
Set B moves to D2
Set B moves to D3
Set C moves to D2 (in this example, Set C is not permitted to move to D1)
Set C moves to D3

At 1510, a pair including a selected candidate destination storage device and a selected set of VMs to move the selected candidate destination storage device to is determined based at least in part on the corresponding updated combined predicted metric data structures. In various embodiments, the pair of the set of VMs and the corresponding candidate destination storage device that yields the best (e.g., lowest probability) combined predicted metric corresponding to the highest priority is selected as the most desirable pair of selected candidate destination storage device and the selected set of VMs to move that selected candidate destination storage device, to be recommended. In the event that there are two or more tied pairs of sets of VMs and corresponding candidate destination storage devices (e.g., candidate destination storage devices for which the respective updated combined predicted metric data structures are tied), then one or more tiebreaker rules may be used to select one of the pairs of a set of VMs and corresponding candidate destination storage devices. For example, a tiebreaker rule may dictate to select the pair of a set of VMs and the corresponding candidate destination storage device that either has the most remaining storage usage and/or the candidate destination storage device for which the least amount of bytes will be required to be moved.

First, the updated combined predicted metric data structures associated with the corresponding pairs of sets of VMs and candidate destination storage devices are compared against each other. In some embodiments, pairwise comparisons are made between each two updated combined predicted metric data structures corresponding to two different pairs of sets of VMs and corresponding candidate destination storage devices. In some embodiments, the combined predicted metrics from the two updated combined predicted metric data structures are compared in a lexicographic comparison in which the combined predicted metrics of the same metric type are compared against each other, starting from those of the highest priority level. If the combined predicted metrics were individual values and one of the combined predicted metrics were higher than the other, then the updated combined predicted metric data structure with the higher value is considered the better updated combined predicted metric data structure and the pairwise comparison ends. However, if the combined predicted metrics were individual values and the two combined predicted metrics were the same, then the two updated combined predicted metric data structures are tied and the comparison moves on to comparing the combined predicted metrics at the next highest priority level. If the combined predicted metrics were ranges of values, then the updated combined predicted metric data structure with the value at the lowest bound of the range that is greater than the value at the highest bound of the other updated combined predicted metric data structure (e.g., the updated combined predicted metric data structure with the range of values that is entirely greater than the range of values of the other updated combined predicted metric data structure) is considered the better updated combined predicted metric data structure of the two and the pairwise comparison ends. However, if the combined predicted metrics were ranges of values and the ranges of two combined predicted metrics at least partially overlapped, then the two updated combined predicted metric data structures are tied and the comparison moves on to comparing the combined predicted metrics at the next highest priority level. In summary, a first updated combined predicted metric data structure corresponding to a first candidate destination storage device would be considered to be better than a second updated combined predicted metric data structure corresponding to a second candidate destination storage device in the event that in a lexicographic comparison, in which the combined predicted metrics are compared starting at the highest priority level, the updated combined predicted metric data structure that first includes a combined predicted metric of a greater value or a greater range is considered to be the better updated combined predicted metric data structure.

For example, assume that the first updated combined predicted metric data structure includes metrics a, b, c, and ordered as (a, b, c) and the second updated combined predicted metric data structure includes metrics d, e, f, ordered as (d, e, f). The first updated combined predicted metric data structure is better than the second updated combined predicted metric data structure if any of the following three statements were true:

a>d; or a==d and b>e; or a d, b e, and c>f

The pair including a set of VMs and a corresponding candidate destination storage device associated with the best updated combined predicted metric data structure is selected as the pair of selected set of VMs and the selected corresponding candidate destination storage device to which the set of VMs will potentially be recommended to migrate.

Tied pairs of sets of VMs and their corresponding candidate destination storage devices are those with updated combined predicted metric data structures for which combined predicted metrics at every priority level are tied. In the event that two (or more) of the updated combined predicted metric data structures corresponding to different pairs of sets of VMs and their corresponding candidate destination storage devices were tied, then a tiebreaking process is performed to determine to which pair of sets of VMs and corresponding candidate destination storage devices to select. In various embodiments, among the tied pairs of sets of VMs and their corresponding candidate destination storage devices, the set of VMs and its corresponding candidate destination storage device to which the set of VMs could be migrated to with the lowest cost is selected as the pair of set of VMs and the destination storage device to which the set of VMs will potentially be recommended to migrate. The following is an example technique by which to select one among multiple tied pairs of sets of VMs and their corresponding candidate destination storage devices:

In some embodiments, it is generally desirable to move VMs toward empty storage devices (even if the choice of storage devices is not close enough to a metric threshold to trigger an absolute preference). But, it is also a good idea to spread the load of storage migration a bit rather than migrating all VMs onto just one storage device. Thus, in some embodiments, a stochastic tiebreaker weighted by free space, average load, and available flash is used to select one among multiple tied candidate destination storage devices for a set of VMs.

Tiebreaker preference=1/(used space)+1/(average load)+1/(used flash)

Used space is just percentage of the available physical space in use.

Average load is the average of the load metric (0-100%) across the past week.

Available flash is the fraction of flash required if the working set is computed for a 99.9% flash hit rate.

For example, if two mainly-idle storage devices, A and B, respectively, are at 20% and 25% capacity, 5% and 6% load, and 10% flash used, the metrics are:

$$A=1/0.20+1/0.05+1/0.10=35 \quad B=1/0.25+1/0.06+1/0.10=30.7$$

Storage Device A would be selected with probability 35/(30.7+35)=53%.

Returning to the example above, of the eight evaluated potential moves of sets of VMs, moving Set B to storage device D2 is determined to yield the updated combined predicted metric data structure that includes the moved improved (best) combined predicted metric associated with the highest priority.

At 1512, it is determined whether to recommend moving the selected set of VMs to the selected candidate destination storage device. In the event that the selected set of VMs is not to be moved, process 1500 ends. Otherwise, in the event that the selected set of VMs is to be moved, control is transferred to 1514.

The updated combined predicted metric data structure of the selected pair including the selected set of VMs and the selected candidate destination storage device is compared to the best so far combined predicted metric data structure that was obtained at step 1502. Based on the same lexicographic comparison that was described earlier, if the updated combined predicted metric data structure of the selected pair including the selected set of VMs and the selected candidate destination storage device is better than the best so far combined predicted metric data structure, then it is predicted that the migration of the selected set of VMs to the selected candidate destination storage device further improves the combined predicted metric data structure for the pool, on top of any previously recommended migrations of other set(s) of VMs (that had been determined for high priority combined predicted metrics that were selected to improve). Therefore, it is determined to recommend migrating the selected set of VMs to the selected candidate destination storage device. In some embodiments, the selected set of VMs is split up and some VM(s) may be recommended to migrate to a first selected candidate destination storage device and some other VM(s) may be recommended to migrate to a second selected candidate destination storage device.

However, if the updated combined predicted metric data structure of the selected destination storage device is not better than (e.g., is worse than or is tied with) the best so far combined predicted metric data structure, then it is predicted that the migration of the selected set of VMs to the selected candidate destination storage device does not further improve the combined predicted metric data structure for the pool, on top of any previously determined migrations of other set(s) of VMs. Therefore, it is determined to not recommend migrating the selected set of VMs to the selected candidate destination storage device in the current instance of process 1500. However, process 1500 may be implemented again for sets of VMs that are formed (e.g., by a process such as process 1100 of FIG. 11) for the next highest priority selected combined predicted metric to improve. This has two benefits; one is that the lower-priority selected combined predicted metric to improve may be on other storage devices within the pool, or involve VMs that have more freedom to move, and the other is that it provides multiple chances at fixing a problem that was not able to be completely solved the first time. For example, because all the space usage combined predicted metrics are driven from a common model, this means that there are actually several attempts to find a good set of VMs to move, once at the 100% space usage metric type, then again at each of the 98% space usage metric type, 95% space usage metric type, and 90% space usage metric type (assuming that these such metric types are included in a pool's combined predicted metric data structure). For example, perhaps the sets of VMs that are formed for a higher priority selected combined predicted metric to improve get the first 50% of the problem solved but are not big enough to solve the remaining 50%. The remainder of the problem may be fixed by the sets of VMs that are formed for lower priority selected combined predicted metrics to improve.

At 1514, the pair including the selected set of VMs and the selected candidate destination storage device is added to a current set of recommendations.

At 1516, the selected set of VMs is committed to the selected candidate destination storage device. Committing the candidate set of VMs to the selected candidate destination storage device includes preventing any VM of the candidate set from being included in a subsequently generated recommendation. As such, in some embodiments, subsequently generated recommendations do not include overlapping VMs as previously generated recommendations. The best so far combined predicted metric data structure is also updated to equal the updated combined predicted metric data structure of the selected set of VMs and its corresponding candidate destination storage device so that it is the starting point for the next iteration of process 1500 (for the next highest priority combined predicted metric to improve).

Each VM in the current set of recommendations is tagged with the combined predicted metrics that were improved by moving the set of VMs.

If the selected candidate destination storage device is one from which VMs were previously moved off, then the current recommendation set should preserve this ordering by putting the new set into a separate group from the previous set.

For example, if a set of VMs that is formed for combined space usage related Metric 1 that is selected to improve (of the example of FIG. 10), including VM-123 and VM-456, was recommended to move from source Storage Device A to selected destination Storage Device B, then in later evaluating a set of VMs is formed for combined space usage related Metric 3 that is selected to improve (of the example of FIG. 10), it is assumed that VM-123 and VM-456 have already been migrated to selected destination Storage Device B. As such, computations of predicted metrics for the later formed set of VMs will assume that the historical data for VM-123 and VM-456 have already been removed from Storage Device A and added to selected destination Storage Device B.

In various embodiments, the generated set of recommendations is presented at a user interface. The set of recommendations includes recommendations to migrate one or more sets of VMs to each of their corresponding, selected destination storage devices. Each recommendation may be presented with the corresponding pool-level combined predicted metric that is predicted to improve as a result of the migration of the particular set of VMs. A user may select a presented recommendation at the user interface to cause the selected recommendation to be taken (i.e., to cause the set of VMs of the recommendation to be migrated to the corresponding selected destination storage device of the recommendation).

Figure 16:
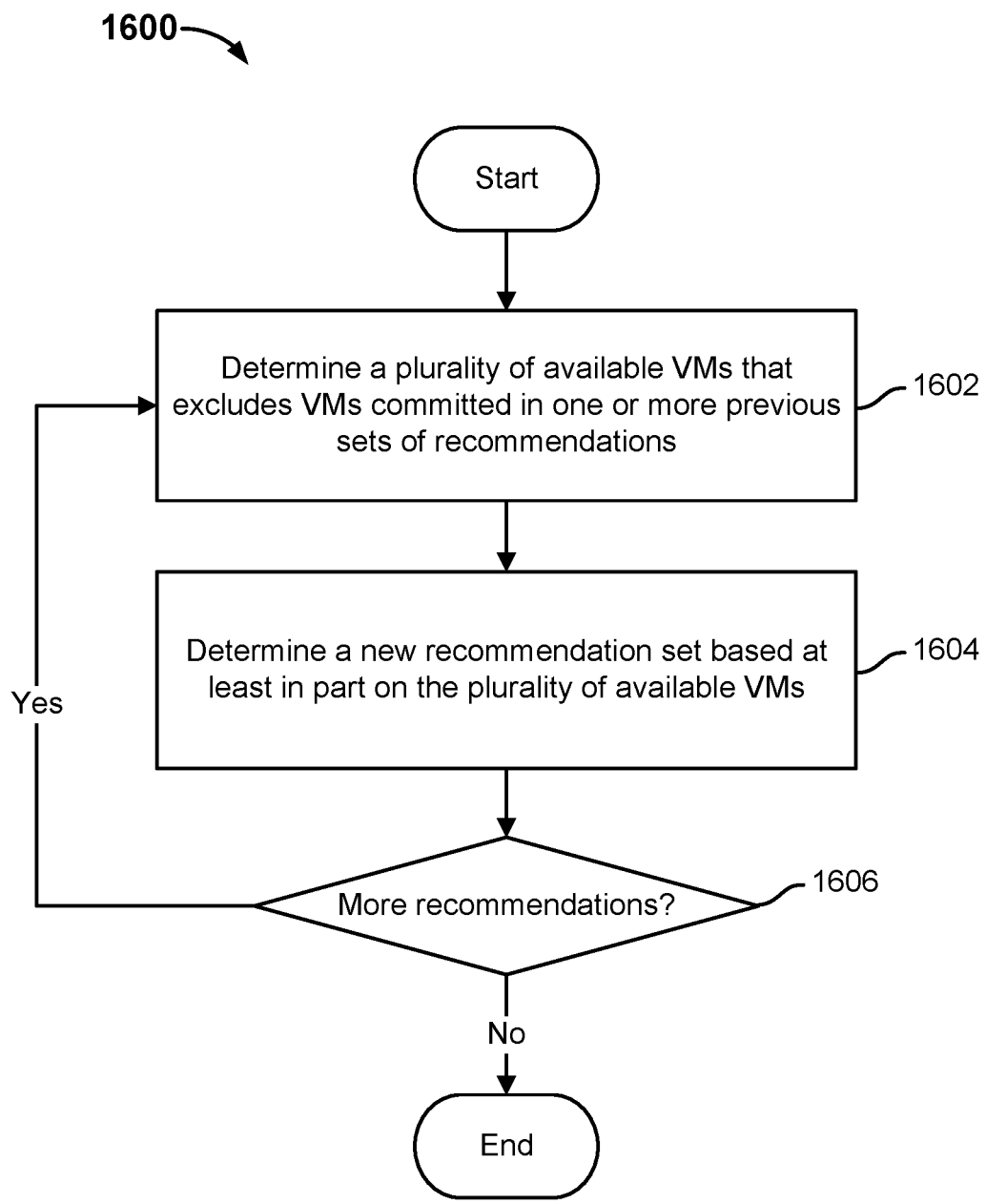
FIG. 16 is a flow diagram showing an example of a process for determining alternative sets of recommendations.

FIG. 16 is a flow diagram showing an example of a process for determining alternative sets of recommendations. In some embodiments, process 1600 is implemented by VM load balancing server 112 of system 100 of FIG. 1.

Process 1600 is an example process that may be implemented to determine alternative sets of recommendations. As will be described below, alternative sets of recommendations do not include common VMs. Alternative sets of recommendations may be determined in response to the same recommendation generation event (e.g., which happens on a weekly interval).

At 1602, a plurality of available VMs that excludes VMs committed in one or more previous sets of recommendations is determined. Any VMs that were included in any previously generated sets of recommendations (e.g., generated using a process such as process 1100 of FIG. 11) are excluded from the set of all available VMs among the pool of storage devices. By excluding VMs that have already been committed to a previously generated set of recommendations, VMs that are already present in another set of recommendations are prevented from being considered to be added to a new set of recommendations.

At 1604, a new recommendation set is determined based at least in part on the plurality of available VMs. In various embodiments, a process such as process 1100 of FIG. 11 is performed again based on the available VMs determined at step 1602 to determine a new, alternative set of recommendations, which could be alternatively presented to a user and/or implemented relative to a previously or even subsequently generated set of recommendations. In various embodiments, while VMs that were included in any previously generated sets of recommendations are excluded from the available VMs from which new sets of VMs may be formed, the excluded VMs are still considered to reside at their current source storage devices and therefore their respective historical data is also evaluated when determining predicted metrics at those current source storage devices for the new set of recommendations. Put another way, the VMs that were included in any previously generated sets of recommendations are considered to be immovable from their current source storage devices in the generation of a new set of recommendations.

At 1606, it is determined whether any more sets of recommendations are to be generated. In the event that at least one more set of recommendations is to be generated, control is returned to step 1602. Otherwise, in the event that at least one more set of recommendations is not to be generated, process 1600 ends.

In some embodiments, a predetermined number (e.g., four) of alternative sets of recommendations may be generated for each recommendation generation event so that a set of recommendations may be easily replaced by an alternative, if appropriate.

In some embodiments, the sets of recommendations may be ranked first by the resulting combined predicted metric data structure, and then tie-broken by the lowest cost of implementing each set of recommendations. The best set of recommendations by this ordering may not be the initially generated set of recommendations, although on average it should be since that is least constrained.

It may be desirable to generate alternative sets of recommendations that do not include overlapping VMs in the event that a set of recommendations becomes unavailable because, for example, it is rejected by the user and/or a recommendation in a set of recommendations becomes invalidated. In the event that a set of recommendations becomes unavailable for whatever reason, another, alternative (e.g., lower ranking) set of recommendations may be presented to the user.

The following are example scenarios and rules for when a set of recommendations may become invalidated:

When is a recommendation no longer usable? The following are three example types of changes that may affect it: change in pool membership, change in VM state, and change in storage device capacity.

If a new storage device is added to a pool, then this may make it an attractive destination but does not make a recommendation worse. The user might choose to wait for a new recommendation using the new storage device, but in some embodiments, the addition of a new member to an existing pool of storage devices does not invalidate a previously generated recommendation for that pool.

EXAMPLE RULE 1: If a storage device was a source or target of a VM move in a recommendation, that recommendation is invalid if the storage device is no longer part of the pool.

This rule also covers removal of a datastore from the storage device—VMs which would go to that datastore will not be able to be moved.

If a VM is being moved, it is to free resources on the storage device. Deleting the VM or moving it elsewhere accomplishes that goal as well. Therefore, the removal of a VM that was part of a recommendation does not invalidate the recommendation. (A move might have impact on a destination storage device, which will be handled in a later section.)

If a VM transitions from live to synthetic, the synthetic VM should still be moved as part of the recommendation. (In some embodiments, the optimization is to move it only if the problem attached to that VM is space, not I/O or working set.)

EXAMPLE RULE 2: If a VM was not previously in a cloning relationship, but is now the parent of a clone, the recommendation is invalid because the space used by that VM will not be freed.

EXAMPLE RULE 3: If a VM was initially recommended to move, but an affinity rule or policy now prohibits the move, the recommendation is invalidated.

Any other condition that would prohibit the VM from being a candidate, such as enabling 1-minute snapshots, will also cause the recommendation to be invalidated.

A VM whose protection policy has changed could cause the recommendation to become worse (by breaking the protection policy).

If the VM suddenly balloons in size, it may cause a problem on the target that was not previously part of the recommendation.

EXAMPLE RULE 4: If the space usage on a storage device was not previously predicted to hit a problem space threshold (90, 95, 98, or 100%) as a result of VM movement, but would now immediately do so as a result of the VM movement, then invalidate the recommendation.

Figure 17:
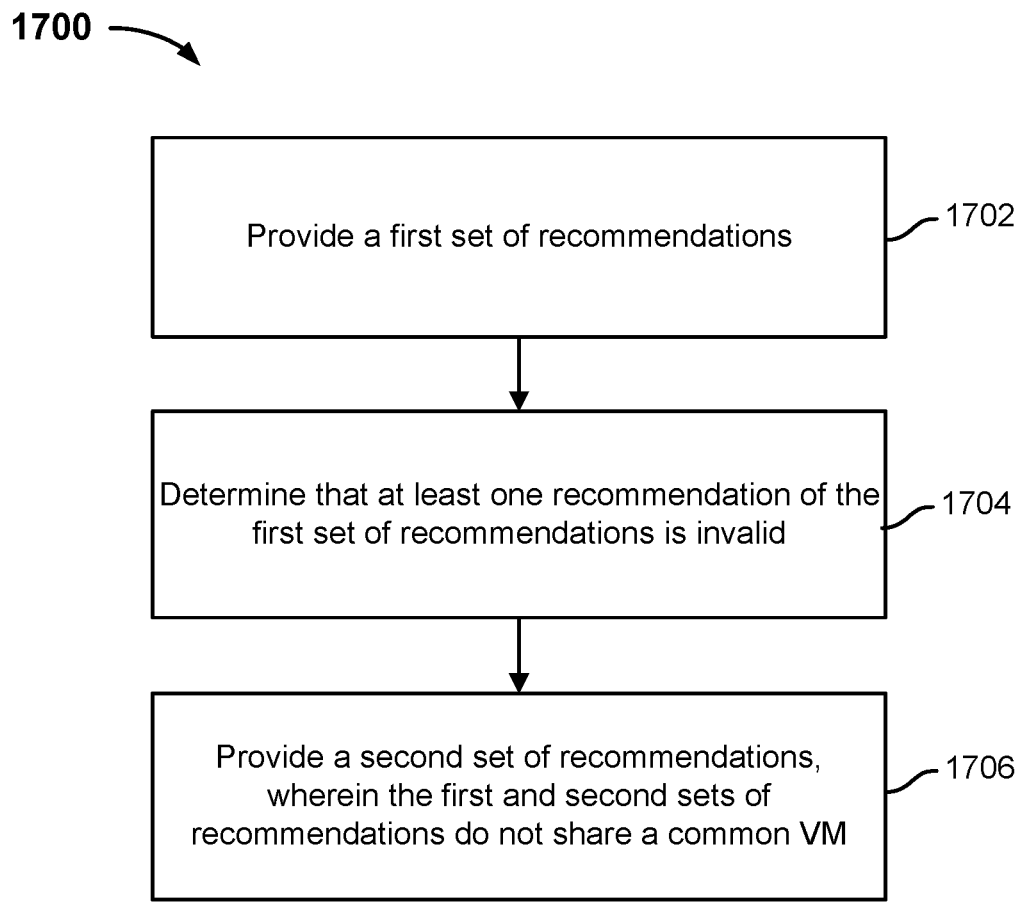
FIG. 17 is a flow diagram showing an example of a process for presenting an alternative set of recommendations.

FIG. 17 is a flow diagram showing an example of a process for presenting an alternative set of recommendations. In some embodiments, process 1700 is implemented by VM load balancing server 112 of system 100 of FIG. 1.

Process 1700 is an example process that may be implemented to determine whether one set of recommendations is invalidated and that an alternative set of recommendations should be provided instead.

At 1702, a first set of recommendations is provided. A first set of recommendations may be presented at a user interface for a user to consider.

At 1704, it is determined that at least one recommendation of the first set of recommendations is invalid. For example, at least one recommendation of the presented set may be determined to be invalid (e.g., using rules such as those described above). Because one recommendation in a set is invalid, the entire set of recommendations is invalidated.

At 1706, a second set of recommendations is provided, wherein the first and second sets of recommendations do not share a common VM. A second set of recommendations, that was determined to be alternative to the presented first set and that does not include any overlapping VMs as the presented first set, may be presented at the user interface to replace the first set, which becomes no longer presented. The first and second sets of recommendations may be determined using a process such as process 1600 of FIG. 16.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
  select a combined predicted metric to be improved from a first combined predicted metric data structure corresponding to a plurality of storage devices,
    wherein the combined predicted metric corresponds to a predicted probability that a specified event associated with a corresponding metric type will occur with respect to any storage device within the plurality of storage devices; and
    wherein to select the combined predicted metric comprises to determine that the combined predicted metric is greater than a threshold value;
  determine a set of two or more VMs to be moved from a source storage device included in the plurality of storage devices to a destination storage device included in the plurality of storage devices such that the selected combined predicted metric to improve is predicted to improve, wherein to determine the set of two or more VMs includes to:
    determine a candidate set of two or more VMs from a plurality of available VMs, wherein an available VM is a VM that is permitted to be migrated from its respective source storage device, wherein determining the candidate set of two or more VMs includes to:
      generate a simulated removal of historical data associated with the candidate set of two or more VMs from the source storage device;
      generate an updated storage device specific predicted metric data structure corresponding to the source storage device based at least in part on the simulated removal of the historical data associated with the candidate set of two or more VMs;

generate a second combined predicted metric data structure corresponding to the plurality of storage devices based at least in part on the updated storage device specific predicted metric data structure corresponding to the source storage device and storage device specific predicted metric data structures corresponding to storage devices in the plurality of storage devices other than the source storage device;

determine an updated combined predicted metric from the second combined predicted metric data structure corresponding to the plurality of storage devices; and determine that the updated combined predicted metric is improved from the selected combined predicted metric to be improved based at least in part on determining that the updated combined predicted metric is equal to or less than the threshold value;

select a pair including a selected candidate destination storage device and the candidate set of two or more VMs to move to the selected candidate destination storage device based at least in part on the updated combined predicted metric; and migrate the candidate set of two or more VMs to the selected candidate destination storage device; and a memory coupled to the processor and configured to store the selected combined predicted metric to be improved.

2. The system of claim 1, wherein the processor is further configured to:
determine the plurality of available VMs associated with the plurality of storage devices;
determine a plurality of groups of VMs from the plurality of storage devices, wherein each group of VMs is associated with a common attribute;
concatenate the plurality of groups of VMs; and
form sets of VMs from the concatenated plurality of groups of VMs, wherein a removal of the set of two or more VMs from the source storage device is predicted to improve the selected combined predicted metric to improve.

3. The system of claim 2, wherein the plurality of available VMs is determined based at least in part on one or more stored affinity rules.

4. The system of claim 2, wherein the common attribute associated with each group of VMs is determined based on a stored affinity rule.

5. The system of claim 1, wherein the processor is further configured to:
determine that the candidate set of two or more VMs is statistically significant; and
determine that the candidate set of two or more VMs is the set of two or more VMs.

6. The system of claim 1, wherein the processor is further configured to:
obtain a plurality of sets of VMs to potentially move for the combined predicted metric to be improved, wherein the plurality of sets of VMs includes the set of two or more VMs;
determine a plurality of candidate destination storage devices to which at least one set of VMs included in the plurality of sets of VMs is allowed to move, wherein the plurality of candidate destination storage devices includes the destination storage device; and
determine a corresponding updated combined predicted metric data structure associated with moving each set of VMs to each candidate destination storage device to which that set of VMs is allowed to move;
wherein the selected candidate destination storage device comprises the destination storage device and the candidate set of two or more VMs comprises the set of two or more VMs.

7. The system of claim 6, wherein to select the pair including the selected candidate destination storage device and the candidate set of two or more VMs comprises to perform pairwise comparisons among the corresponding updated combined predicted metric data structures.

8. The system of claim 1, wherein the processor is further configured to include a recommendation that recommends moving the set of two or more VMs from the source storage device to the destination storage device into a first set of recommendations.

9. The system of claim 8, wherein the processor is further configured to:
determine an updated plurality of available VMs that excludes VMs committed in the first set of recommendations; and
determine a second set of recommendations based at least in part on the updated plurality of available VMs.

10. The system of claim 9, wherein the processor is further configured to:
provide the first set of recommendations;
determine that at least one recommendation of the first set of recommendations is invalid; and
provide the second set of recommendations, wherein the first set of recommendations and the second set of recommendations do not share a common VM.

11. The system of claim 1, wherein the processor is further configured to:
determine the plurality of available VMs associated with the plurality of storage devices using a set of affinity rules that describe which storage devices one or more VMs can be moved from or be moved to.

12. The system of claim 1, wherein to generate the second combined predicted metric data structure corresponding to the plurality of storage devices based at least in part on the updated storage device specific predicted metric data structure corresponding to the source storage device and the storage device specific predicted metric data structures corresponding to storage devices in the plurality of storage devices other than the source storage device includes to:
combine a first predicted metric from the updated storage device specific predicted metric data structure corresponding to the source storage device and a second predicted metric from a storage device specific predicted metric data structure corresponding to another storage device, wherein the first predicted metric and the second predicted metric correspond to a same metric type.

13. A method, comprising:
selecting a combined predicted metric to be improved from a first combined predicted metric data structure corresponding to a plurality of storage devices,
wherein the combined predicted metric corresponds to a predicted probability that a specified event associated with a corresponding metric type will occur with respect to any storage device within the plurality of storage devices;
wherein selecting the combined predicted metric comprises determining that the combined predicted metric is greater than a threshold value; and
determining a set of two or more VMs to be moved from a source storage device included in the plurality of storage devices to a destination storage device included in the plurality of storage devices such that the selected combined predicted metric to improve is predicted to improve, wherein to determine the set of two or more VMs includes:
  determining a candidate set of two or more VMs from a plurality of available VMs, wherein an available VM is a VM that is permitted to be migrated from its respective source storage device, wherein determining the candidate set of two or more VMs includes:
    generating a simulated removal of historical data associated with the candidate set of two or more VMs from the source storage device;
    generating an updated storage device specific predicted metric data structure corresponding to the source storage device based at least in part on the simulated removal of the historical data associated with the candidate set of two or more VMs;
    generating a second combined predicted metric data structure corresponding to the plurality of storage devices based at least in part on the updated storage device specific predicted metric data structure corresponding to the source storage device and storage device specific predicted metric data structures corresponding to storage devices in the plurality of storage devices other than the source storage device;
    determining an updated combined predicted metric from the second combined predicted metric data structure corresponding to the plurality of storage devices; and
    determining that the updated combined predicted metric is improved from the selected combined predicted metric to be improved based at least in part on determining that the updated combined predicted metric is equal to or less than the threshold value;
  selecting a pair including a selected candidate destination storage device and the candidate set of two or more VMs to move to the selected candidate destination storage device based at least in part on the updated combined predicted metric; and
  migrating the candidate set of two or more VMs to the selected candidate destination storage device.

14. The method of claim 13, further comprising:
  determining the plurality of available VMs associated with the plurality of storage devices;
  determining a plurality of groups of VMs from the plurality of storage devices, wherein each group of VMs is associated with a common attribute;
  concatenating the plurality of groups of VMs; and
  forming sets of VMs from the concatenated plurality of groups of VMs, wherein a removal of the set of two or more VMs from the source storage device is predicted to improve the selected combined predicted metric to improve.

15. The method of claim 14, wherein the plurality of available VMs is determined based at least in part on one or more stored affinity rules.

16. The method of claim 14, wherein the common attribute associated with each group of VMs is determined based on a stored affinity rule.

17. The method of claim 13, further comprising:
  determining that the candidate set of two or more VMs is statistically significant; and
  determining that the candidate set of two or more VMs is the set of two or more VMs.

18. The method of claim 13, further comprising:
  obtaining a plurality of sets of VMs to potentially move for the combined predicted metric to be improved, wherein the plurality of sets of VMs includes the set of two or more VMs;
  determining a plurality of candidate destination storage devices to which at least one set of VMs included in the plurality of sets of VMs is allowed to move, wherein the plurality of candidate destination storage devices includes the destination storage device;
  determining a corresponding updated combined predicted metric data structure associated with moving each set of VMs to each candidate destination storage device to which that set of VMs is allowed to move; and
  wherein the selected candidate destination storage device comprises the destination storage device and the candidate set of two or more VMs comprises the set of two or more VMs.

19. The method of claim 18, wherein selecting the pair including the selected candidate destination storage device and the candidate set of two or more VMs comprises performing pairwise comparisons among the corresponding updated combined predicted metric data structures.

20. The method of claim 13, further comprising including a recommendation that recommends moving the set of two or more VMs from the source storage device to the destination storage device into a first set of recommendations.

21. The method of claim 20, further comprising:
  determining an updated plurality of available VMs that excludes VMs committed in the first set of recommendations; and
  determining a second recommendation set based at least in part on the updated plurality of available VMs.

22. A computer program product, the computer program product being embodied in a non-transitory computer readable storage medium and comprising computer instructions for:
  selecting a combined predicted metric to be improved from a first combined predicted metric data structure corresponding to a plurality of storage devices,
    wherein the combined predicted metric corresponds to a predicted probability that a specified event associated with a corresponding metric type will occur with respect to any storage device within the plurality of storage devices; and
    wherein selecting the combined predicted metric comprises determining that the combined predicted metric is greater than a threshold value;
  determining a set of two or more VMs to be moved from a source storage device included in the plurality of storage devices to a destination storage device included in the plurality of storage devices such that the selected combined predicted metric to improve is predicted to improve, wherein to determine the set of two or more VMs includes:
    determining a candidate set of two or more VMs from a plurality of available VMs, wherein an available VM is a VM that is permitted to be migrated from its respective source storage device, wherein determining the candidate set of two or more VMs includes:
      generating a simulated removal of historical data associated with the candidate set of two or more VMs from the source storage device;
      generating an updated storage device specific predicted metric data structure corresponding to the source storage device based at least in part on the simulated removal of the historical data associated with the candidate set of two or more VMs;

generating a second combined predicted metric data structure corresponding to the plurality of storage devices based at least in part on the updated storage device specific predicted metric data structure corresponding to the source storage device and storage device specific predicted metric data structures corresponding to storage devices in the plurality of storage devices other than the source storage device;

determining an updated combined predicted metric from the second combined predicted metric data structure corresponding to the plurality of storage devices; and determining that the updated combined predicted metric is improved from the selected combined predicted metric to be improved based at least in part on determining that the updated combined predicted metric is equal to or less than the threshold value;

selecting a pair including a selected candidate destination storage device and the candidate set of two or more VMs to move to the selected candidate destination storage device based at least in part on the updated combined predicted metric; and migrating the candidate set of two or more VMs to the selected candidate destination storage device.

* * * * *